(12) United States Patent
Vikberg et al.

(10) Patent No.: US 10,630,847 B2
(45) Date of Patent: Apr. 21, 2020

(54) METHODS AND NODES FOR ENABLING MANAGEMENT OF TRAFFIC STEERING POLICY

(71) Applicant: Telefonaktiebolaget LM Ericsson (publ), Stockholm (SE)

(72) Inventors: Jari Vikberg, Järna (SE); Ralf Keller, Würselen (DE); Stefan Rommer, Västra Frölunda (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 16/328,170

(22) PCT Filed: Sep. 7, 2016

(86) PCT No.: PCT/EP2016/071057
§ 371 (c)(1),
(2) Date: Feb. 25, 2019

(87) PCT Pub. No.: WO2018/046081
PCT Pub. Date: Mar. 15, 2018

(65) Prior Publication Data
US 2019/0191035 A1    Jun. 20, 2019

(51) Int. Cl.
*G01R 31/08* (2020.01)
*H04M 15/00* (2006.01)
(Continued)

(52) U.S. Cl.
CPC ........ *H04M 15/66* (2013.01); *H04L 12/1407* (2013.01); *H04L 12/1467* (2013.01);
(Continued)

(58) Field of Classification Search
CPC .. H04M 15/66; H04M 15/8214; H04M 17/35; H04M 3/367; H04M 2215/7428; H04L 12/1407; H04L 12/1467
(Continued)

(56) References Cited

U.S. PATENT DOCUMENTS

2017/0366679 A1* 12/2017 Mohamed ............. H04M 15/43

FOREIGN PATENT DOCUMENTS

WO    2010128786 A2    11/2010
WO    2016072898 A1    5/2016

OTHER PUBLICATIONS

International Search Report and Written Opinion dated Dec. 8, 2016, for corresponding International Application No. PCT/EP2016/071057, International filing date; Sep. 7, 2016; consisting of 9 pages.
(Continued)

*Primary Examiner* — Huy C Ho
(74) *Attorney, Agent, or Firm* — Patent Portfolio Builders, PLLC

(57) ABSTRACT

A method and a radio network node, a method and a core network node as well as a method and a charging node for enabling management of a traffic steering policy are disclosed. The radio network node receives, from the core network node, an indication of the traffic steering policy indicating one or more access resources and at least one of a PDN connection, a packet flow and a bearer to use on the one or more access resources. Furthermore, the radio network node determines to steer traffic. radio network node transmits access information to the core network node. The access information indicates a currently used access resource for the PDN connection, the packet flow or the bearer. The core network node transmits the access information. The charging node determines an amount of traffic
(Continued)

for the PDN connection, packet flow or bearer on the currently used access resource.

14 Claims, 14 Drawing Sheets

(51) Int. Cl.
    *H04L 12/14*     (2006.01)
    *H04M 17/00*     (2006.01)
    *H04M 17/02*     (2006.01)

(52) U.S. Cl.
    CPC ....... *H04M 15/8214* (2013.01); *H04M 17/00* (2013.01); *H04M 17/02* (2013.01); *H04M 17/35* (2013.01)

(58) Field of Classification Search
    USPC ...................................... 370/230.1
    See application file for complete search history.

(56) References Cited

OTHER PUBLICATIONS

3GPPTS TS 23.203(Release 13); 3rd Generation Partnership Project; Technical Specification Group Services and System Aspects; Policy and charging control architecture; V13.4.0 (Jun. 2015); consisting of 235 pages.

3GPP TS 23.401; 3rd Generation Partnership Project; Technical Specification Group Services and System Aspects; General Packet Radio Service (GPRS) enhancements for Evolved Universal Terrestrial Radio Access Network (E-UTRAN) access (Release 14); V14.0.0 (Jun. 2016); consisting of 374 pages.

3GPP TS 23.402; 3rd Generation Partnership Project;Technical Specification Group Services and System Aspects; Architecture enhancements for non-3GPP accesses (Release 14); V14.0.0 (Jun. 2016); consisting of 301 pages.

3GPP TS 23.203(Release 14); 3rd Generation Partnership Project; Technical Specification Group Services and System Aspects; Policy and charging control architecture ; V14.0.0 (Jun. 2016); consisting of 245 pages.

* cited by examiner

METHODS AND NODES FOR ENABLING MANAGEMENT OF TRAFFIC STEERING POLICY

CROSS-REFERENCE TO RELATED APPLICATIONS

This application is a Submission Under 35 U.S.C. § 371 for U.S. National Stage Patent Application of International Application Number: PCT/EP2016/071057, filed Sep. 7, 2016 entitled "METHODS AND NODES FOR ENABLING MANAGEMENT OF TRAFFIC STEERING POLICY," the entirety of which is incorporated herein by reference.

TECHNICAL FIELD

Embodiments herein relate to charging users for data transmission in a wireless communication system, such as a telecommunication system, a cellular system or the like. In particular, a method and a radio network node for enabling management of a traffic steering policy, a method and a core network node for enabling management of a traffic steering policy as well as a method and a charging node for enabling management of a traffic steering policy are disclosed. Corresponding computer programs and computer program carriers are also disclosed.

BACKGROUND

Charging of users for data transmission in a wireless communication system provides a means for operators to exploit business models that are intended to bring profit to the operators.

Within Third Generation Partnership Project (3GPP), attempts are made on realizing a tighter integration/aggregation between different accesses, e.g. between 3GPP access and Wireless Local Area Networks (WLANs) access, between legacy LTE access and Fifth Generation (5G) access, between access via licensed spectrum and unlicensed spectrum.

Before briefly outlining scenarios for abovementioned accesses, an overview of charging according to 3GPP is provided.

FIG. 1 is an overview of a so called Evolved Packet Core (EPC) architecture. This architecture is defined in 3GPP Technical Specification (TS) 23.401, in which e.g. PGW (Packet data network GateWay), SGW (Serving Gateway), PCRF (Policy and Charging Rules Function), MME (Mobility Management Entity) and mobile device (UE) are defined and described. An LTE radio access, e.g. Evolved Universal Terrestrial Radio Access Network (E-UTRAN), includes one more so called eNBs, common referred to as base stations.

The SGW acts as an anchor point for wireless device mobility. Moreover, the SGW also includes functionalities, such as temporary downlink data buffering while the UE is being paged, packet routing and forwarding to the right eNB.

The PDN-GW is responsible for tasks such as IP (Internet Protocol) address allocation for the UE, and Quality of Service (QoS) enforcement in the downlink.

The MME handles the access network, while being responsible for tasks such as idle mode tracking of the UEs, paging, retransmission, bearer activation/deactivation, etc.

The PCRF determines policy rules in real-time with respect to the UEs of the system. This may e.g. include aggregating information in real-time to and from the core network and operational support systems, etc. of the system so as to support the creation of rules and/or automatically making policy decisions for user radio terminals currently active in the system based on such rules or similar.

The HSS manages and holds subscription related information in order to support handling of calls and/or data sessions.

The eNBs provides both user plane and control plane protocol terminations towards the UE. The eNBs are interconnected with each other by means of the X2 interface. The eNBs are also connected by means of the S1 interface to the EPC (Evolved Packet Core), more specifically to the MME (Mobility Management Entity) by means of the S1-MME interface and to the Serving Gateway (S-GW) by means of the S1-U interface. The eNB contains for example functions for Radio Resource Management including Radio Bearer Control, Radio Admission Control, Connection Mobility Control, Dynamic allocation of resources to UEs in uplink, downlink and sidelink (scheduling). In addition, the eNB selects an MME for the UE at attach and routes user plane traffic towards the SGW.

Aforementioned FIG. 1 shows the architecture for 3GPP accesses. In those accesses the radio interface is specified by 3GPP, e.g. LTE.

With reference to FIG. 2, there is shown an extension to the EPC architecture in order to allow also non-3GPP accesses. For non-3GPP accesses, air interfaces are not specified by 3GPP, e.g. WLAN. Reference is made to 3GPP TS 23.402 in this respect.

As shown in FIG. 2, usage of a non-3GPP access is visible in the CN, e.g. in the PGW via the S2a and S2b interfaces.

The EPC in 3GPP defines what is called a Policy and Charging Control (PCC) architecture with advanced tools for service-aware Quality of Service (QoS) and charging control on a per-service basis. The main entities of this architecture are shown in FIG. 3. For more details refer to the 3GPP TS 23.203 Policy and Charging Control Architecture.

In the PCC architecture, the PCRF is making decisions about charging depending on the flow being established, e.g. if it is offline or online charging. Therefore, the PCRF needs to be able to keep itself up-to-date about events taking place in the access network. To achieve this, procedures have been defined that allow the PCRF to notify a Policy and Charging Enforcement Function (PCEF) and/or a Bearer Binding and Event Reporting Function (BBERF) about which events the PCRF is interested in. In PCC terminology, the PCRF is said to subscribe to certain events, and that the PCEF/BBERF sets the corresponding event triggers. When an event occurs, and the corresponding event trigger is set, the PCEF/BBERF will report the event to the PCRF and allow the PCRF to revisit its previous policy decisions.

The PCRF is the central entity making PCC decisions based on different inputs:
- Operator configuration in the PCRF that define the policies applied to given services
- Subscription information/policies for a given user, received from the SPR
- Information about the service from the AF
- Information from the access network about what technology is used for a particular user equipment (can change only during handover today), etc.

Moreover, a charging functionality for keeping track of traffic usage by subscribers is located at the PCEF.

As mentioned, with the PCC architecture, charging can be performed as offline charging or as online charging, which will be described in the following.

For offline charging, the PCEF is placed at the PDN Gateway to perform measurements of user plane traffic, e.g. user plane traffic volume and/or time duration of a session. These measurements are configured via policies sent by the PCRF over the Gx reference point (also referred to as Gx interface) e.g. if a given flow should be charged based on volume, time, etc. The PCRF may also send events so the charging can be adapted. These policies are typically obtained at the User Data Repository (UDR).

Based on these measurements, policies and events the PCEF generates charging events later reported to an OFfline Charging System (OFCS). The charging events are sent to the OFCS, where they are formatted into Charging Data Records (CDRs) and sent further on to the billing system at the Business Support System (BSS) domain.

In addition, the PDN Gateway collects charging information per PDN Connection and per bearer e.g. for inter-operator settlement purposes.

Online charging is handled by an Online Charging System (OCS) that is a credit management system for pre-paid charging. In this case, the PCEF interacts with the OCS to check out credit and report credit status via Gy reference point (also referred to as Gy interface), as shown in FIG. 3.

With online charging, the charging information can affect, in real-time, the services being used and therefore a direct interaction of the charging mechanism with the control of network resource usage is required. The online credit management allows an operator to control access to services based on credit status. For example, there has to be enough credit left with the subscription in order for the service session to start or an ongoing service session to continue. The OCS may authorize access to individual services or to a group of services by granting credits for authorized IP flows. Usage of resources is granted in different forms. The OCS may, for example, grant credit in the form of certain amount of time, traffic volume or chargeable events. If a user is not authorized to access a certain service, for example, in case the pre-paid account is empty, then the OCS may deny credit requests and additionally instruct the PCEF to redirect the service request to a specified destination that allows the user to re-fill the subscription.

Referring once more to FIG. 3, in the case of online charging the PCC rules are sent by the PCRF to the PCEF. The PCEF will enforce the policy decision according to the received PCC rule. All user plane traffic for a given subscriber and IP connection passes through the network entity where the PCEF is located. If the PCC rule specified that online charging shall be used for this PCC rule, the PCEF contacts the OCS via the Gy reference point to request credit according to the measurement method specified in the PCC rule.

As further background information, network connections, bearers and flows will now be described.

3GPP defines a concept of a Packet Data Network (PDN). The PDN is typically an IP network, e.g. Internet or an operator IP Multimedia Subsystem (IMS) service network. A PDN has one more names, where each name is defined in a string called APN (Access Point Name). The PGW is a gateway towards one or more PDNs. A UE may have one or more PDN connections.

A PDN connection is a logical connection between UE and PGW carrying IP traffic, providing the UE access to a PDN. The setup of a PDN connection is initiated from the UE. Each PDN connection has a single IP address or prefix or may have a pair of IPv4 address and IPv6 prefix. The PDN connection can be setup over a 3GPP access (see e.g. TS 23.401 section 5.3.2 and 5.10.2) or over a non-3GPP access (see e.g. TS 23.402 section 7.2 and 16.2). A UE may have one or more PDN connections over a 3GPP accesses, or one or more PDN connections over a non-3GPP access, or both simultaneously.

Every PDN connection consists of one or more bearers. See TS 23.401 section 4.7.2 for a description of the bearer concept. A bearer uniquely identifies traffic flows that receive a common QoS treatment between a UE and a PGW. Each bearer on a particular access has a unique bearer ID. The bearer IDs assigned for a specific UE on S2a/S2b are independent of the bearer IDs assigned for the same UE on S5 and may overlap in value.

On the 3GPP access, the bearer is end-to-end between UE and PGW. The bearer ID is known by PGW, MME, eNB and UE. On the non-3GPP access, there is typically no bearer concept between UE and TWAG/ePDG. The bearer concept is then only defined between PGW and TWAG/ePDG; i.e. it is only defined over S2a/S2b. In this case, the bearer ID is known by PGW and TWAG/ePDG but not by the UE. Regardless of access type, the PCRF is not aware of bearer IDs.

Every PDN connection has at least one bearer and this bearer is called the default bearer. All additional bearers on the PDN connection are called dedicated bearers.

A bearer carries traffic in the form of IP packets. Which traffic is carried on a bearer is defined by filters. A filter is an n-tuple where each element in the tuple contains a value, a range, or a wildcard. An n-tuple is also known as an IP flow.

An example of a 5-tuple is (dst IP=83.50.20.110, src IP=145.45.68.201, dst port=80, src port=*, prot=TCP). This 5-tuple defines a source and destination IP address, a source and destination port, and a protocol. The source port is a wildcard. Traffic matching this 5-tuple filter would be all TCP traffic from IP=145.45.68.201 to IP=83.50.20.110 and port=80.

A traffic flow template, TFT, contains one or more filters. Every bearer has a TFT. One bearer within a PDN connection and access may lack an explicit TFT (this bearer is typically the default bearer). Implicitly such bearer has a TFT with a single filter matching all packets.

Now returning to the aggregation between 3GPP access and WLAN access, this work is called LTE/WLAN Aggregation (LWA) in 3GPP and, since the aggregation is performed at a Radio Access Network (RAN) layer, scheduling and flow control of the data on WLAN or 3GPP links can be controlled by considering dynamic radio network conditions.

Within the scope of 3GPP Release-13, there has been a growing interest in realizing tighter integration/aggregation between 3GPP and WLAN, for example, the same way as carrier aggregation between multiple carriers in 3GPP, where the WLAN is used just as another carrier.

E-UTRAN supports LWA operation whereby a UE in RRC_CONNECTED is configured by the eNB to utilize radio resources of LTE and WLAN. The eNB supporting LWA is connected to WLAN via an ideal/internal backhaul in the collocated deployment scenario or a non-ideal backhaul in the non-collocated deployment scenario. The overall architecture for the LWA is illustrated in FIG. 4. The WLAN Termination (WT) terminates the Xw interface.

In view of charging, a disadvantage is thus that charging cannot be performed while taking the radio resource used, i.e. LTE or WLAN, into account.

In the above scenario, the WLAN is expected to have a Xw interface that is not existing in some known WLANs, referred to as legacy WLANs herein. Therefore, there is also an ongoing work item in 3GPP to support the LWA for legacy WLANs. The related solution is called LTE-WLAN IP Tunneling (LWIP). This work is called as LTE-WLAN RAN Level Integration supporting legacy WLAN. An idea is accordingly that the WLAN network should not be functionally impacted, i.e. no specific support for any Xw-interface or the like shall be needed in the WLAN. Also in this case, the aggregation between LTE and WLAN is not visible in the CN, i.e. neither in MME nor SGW. Consequently, the LWIP has the same disadvantage as LWA.

In the following scenario, the same disadvantage has also been identified. LTE Licensed Assisted Access (LTE LAA) is shortly about applying LTE Carrier Aggregation also for unlicensed spectrum. Due to an assumed high availability of unlicensed spectrum globally, LTE LAA is intended to exploit the unlicensed spectrum and thereby provide a performance boost to a licensed carrier. Moreover, LTE LAA is thought to be used especially for small cells. A Primary Cell (PCell) is always in the licensed spectrum and a Secondary Cell (SCell) may use unlicensed bands, in addition to or without SCell(s) on licensed bands. LTE LAA is a variant of inter-band aggregation LTE LAA is also called LTE-Unlicensed (LTE-U) and both terms are used in the current document.

Moreover, in a further scenario, relating to 5G, the same disadvantage has also been identified as described in the following.

In 5G, a tight integration of air interfaces is envisioned where, for example, common higher layer protocol layers are used on the top of air-interface specific lower layer protocols. The consequence of such integration is that a radio bearer would be in principle transparent to the core network i.e. it is not known to the core network which access is being used, what performance per access is being achieved and how much data is going via each access.

An example of tight integration between LTE (Evolution) and new "5G RAT", e.g. New Radio (NR) access, in a combined base station for these accesses is shown in FIG. 6. Functionality over the radio interfaces is divided into asynchronous and synchronous functionality. One example of this is that the RLC, MAC and PHY functionalities are kept together since their functionalities are considered as forming a synchronous functional group and RRC and PDPC are kept together since their functionalities are considered as asynchronous. Therefore, the new functional split of the eNB gives two new functional entities, or logical network elements: eNB-a (as eNB-asynchronous) and eNB-s (as eNB-synchronous). In this case the eNB-a can contain common support for both control and user plane for the asynchronous functions for both LTE (Evolution) and new "5G RAT". Furthermore, this also enables that the synchronous functions may be RAT-specific, for example different for LTE RAT and 5G RAT. This case is shown in FIG. 6 where the eNB-a is called "5G & LTE eNB-a" and the eNB-s are called "LTE eNB-s1" and "5G eNB-s2".

In these three scenarios, a problem may be that charging cannot be performed while taking into account which air interface, or radio spectrum that is used by a UE. This limits the way operators can define their business model and charge subscribers flexibly according to their usage of different air interfaces and/or radio spectrums.

As an example, operators may wish to have a more flexible charging, e.g. in terms of differentiation between e.g. WLAN and 3GPP, LTE and 5G, or licensed and unlicensed spectrum.

SUMMARY

An object may be to at least enable more flexible charging of users for data transmission in the wireless communication systems according to the scenarios mentioned above.

According to an aspect, the object is achieved by a method, performed by a radio network node, for enabling management of a traffic steering policy relating to access resources for providing an access to a network for a user equipment. The radio network node receives, from a core network node, an indication of the traffic steering policy. The traffic steering policy indicates one or more access resources and at least one of a Packet Data Network "PDN" connection, a packet flow and a bearer to use on the one or more access resources. The radio network node determines to steer traffic of the user equipment for the at least one of the PDN connection, the packet flow and the bearer, through the one or more access resources. Furthermore, the radio network node transmits access information to the core network node, the access information indicates a currently used access resource, amongst the one or more access resources, for the PDN connection, the packet flow or the bearer.

According to another aspect, the object is achieved by a radio network node configured for enabling management of a traffic steering policy relating to access resources for providing an access to a network for a user equipment, the radio network node is configured for receiving, from a core network node, an indication of the traffic steering policy. The traffic steering policy indicates one or more access resources and at least one of a Packet Data Network "PDN" connection, a packet flow and a bearer to use on the one or more access resources. Moreover, the radio network node is configured for determining to steer traffic of the user equipment for the at least one of the PDN connection, the packet flow and the bearer, through the one or more access resources. The radio network node is further configured for transmitting access information to the core network node, the access information indicates a currently used access resource, amongst the one or more access resources, for the PDN connection, the packet flow or the bearer.

According to a further aspect, the object is achieved by a method, performed by a core network node, for enabling management of a traffic steering policy relating to access resources for providing an access to a network for a user equipment. The core network node transmits, toward a radio network node, an indication of a traffic steering policy. The traffic steering policy indicates one or more access resources and at least one of a PDN connection, a packet flow and a bearer to use on the one or more access resources. Moreover, the core network node receives access information originated from the radio network node, the access information indicates a currently used access resource, amongst the one or more access resources, for a PDN connection, packet flow or bearer. The core network node further transmits, to one of a charging node and a further core network node, the access information indicating the currently used access resource for the PDN connection, packet flow or bearer.

According to yet another aspect, the object is achieved by a core network node configured for enabling management of a traffic steering policy relating to access resources for providing an access to a network for a user equipment. The core network node is configured for transmitting, toward a radio network node, an indication of a traffic steering policy. The traffic steering policy indicates one or more access resources and at least one of a PDN connection, a packet flow and a bearer to use on the one or more access resources. The core network node is further configured for receiving access information originated from the radio network node. The access information indicates a currently used access resource, amongst the one or more access resources, for a PDN connection, packet flow or bearer. Moreover, the core network node is configured for transmitting, to one of a charging node and a further core network node, the access information indicating the currently used access resource for the PDN connection, packet flow or bearer.

In an embodiment, the indication of the traffic steering policy may be transmitted from the core network node and received at the radio network node via control plane signaling. Likewise, the access information may be transmitted from the radio network node and received at the core network node via control plane signaling.

In another embodiment, the indication of the traffic steering policy may be transmitted from the core network node and received at the radio network node via signaling through user plane by means of packet marking. Likewise, the access information may be transmitted from the radio network node and received at the core network node via signaling through user plane by means of packet marking.

In particular, the access information might indicate a plurality of currently used access resources for a number of PDN connections, packet flows or bearers.

According to still another aspect, the object is achieved by a method, performed by a charging node, for enabling management of a traffic steering policy relating to access resources for providing an access to a network for a user equipment. The charging node receives, from a core network node, access information indicating a currently used access resource for a PDN connection, packet flow or bearer, The charging node determines an amount of traffic for the PDN connection, packet flow or bearer on the currently used access resource. Moreover, the charging node manages charging with respect to the user equipment based on the determined amount of traffic on the currently used access resource.

According to a yet further aspect, the object is achieved by a charging node configured for enabling management of a traffic steering policy relating to access resources for providing an access to a network for a user equipment. The charging node is configured for receiving, from a core network node, access information indicating a currently used access resource for a PDN connection, packet flow or bearer. Furthermore, the charging node is configured for determining an amount of traffic for the PDN connection, packet flow or bearer on the currently used access resource. Moreover, the charging node is configured for managing charging with respect to the user equipment based on the determined amount of traffic on the currently used access resource.

In an embodiment, the access information may be transmitted from the core network node and received at the charging node via control plane signaling.

In another embodiment, the access information may be transmitted from the core network node and received at the charging node via signaling through user plane by means of packet marking.

In particular, the access information might indicate a plurality of currently used access resources for a number of PDN connections, packet flows or bearers.

According to further aspects, the object is achieved by computer programs and computer program carriers corresponding to the aspects above.

Thanks to that the radio network node receives the indication of the traffic steering policy from the core network node, the radio network node is able to determine to steer traffic through the one or more access resources, e.g. when any one of the one or more access resources is available. The one or more access resource may be available only during certain times, only at certain locations and the like. Therefore, the core network node is not able to know which of the one or more access resources that is currently used by the user equipment. In order to enable the core network node to inform the charging node, the radio network node thus transmits, to the core network node, the access information indicating the currently used access resource among the one or more access resources. As a result, the above mentioned object is achieved.

The embodiments herein thus support flexible charging even in scenarios where there is a tight integration/aggregation of multiple access resources. In prior art, this integration/aggregation is typically transparent to the core network nodes.

An advantage is thus that the embodiments herein allows operators to apply more flexible business model, in which differentiate charging may be applied for different access resources, e.g. WLAN or LTE, LTE licensed radio spectrum and LTE unlicensed radio spectrum. For example, operators may wish to charge users depending on the access resource they are using, not taking into account in data amount for traffic over WLAN or unlicensed spectrum or depending on time spent using the access resource, etc.

BRIEF DESCRIPTION OF THE DRAWINGS

The various aspects of embodiments disclosed herein, including particular features and advantages thereof, will be readily understood from the following detailed description and the accompanying drawings, in which.

DETAILED DESCRIPTION

Figure 1:
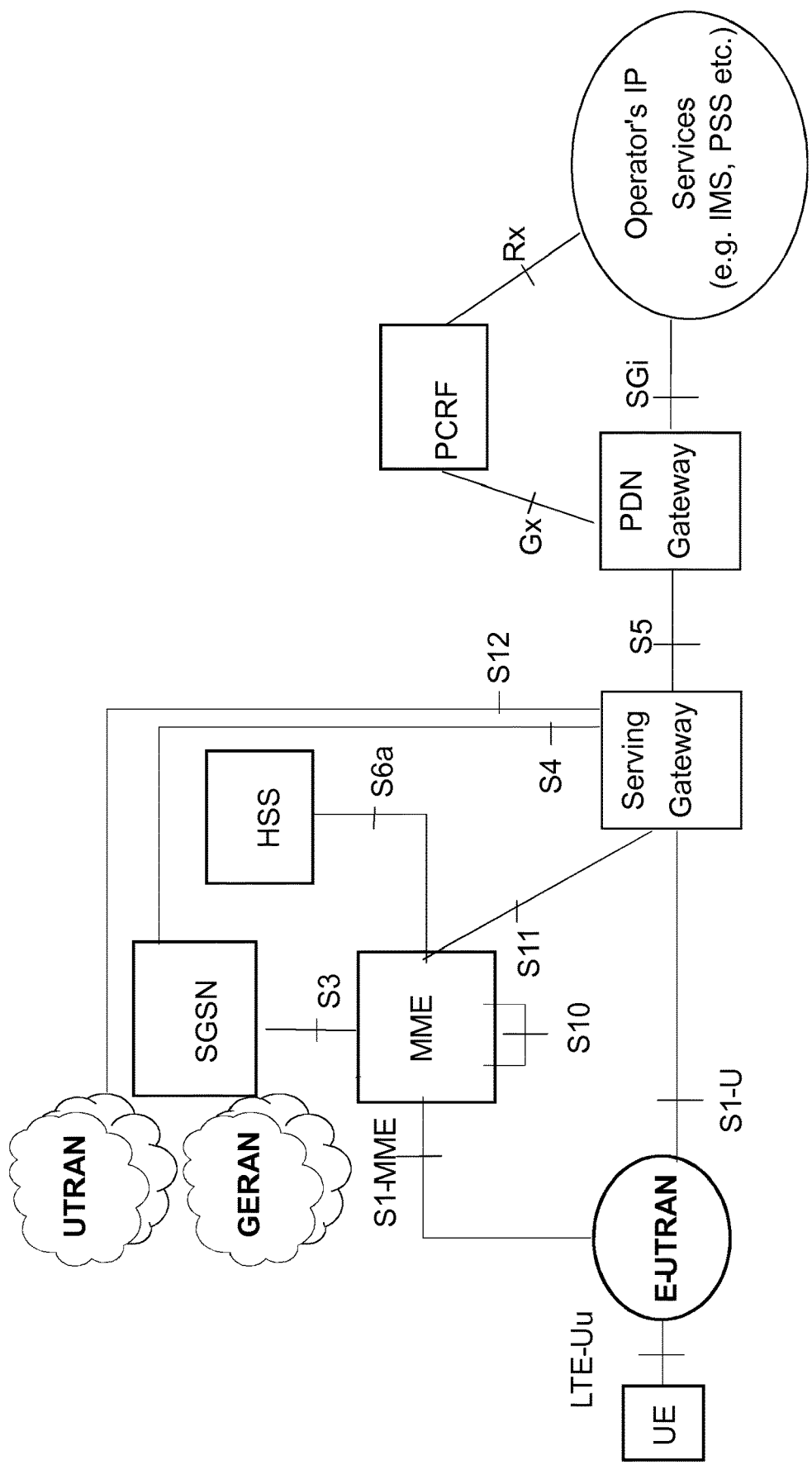
FIG. 1 is a schematic overview of an EPC architecture.
Figure 2:
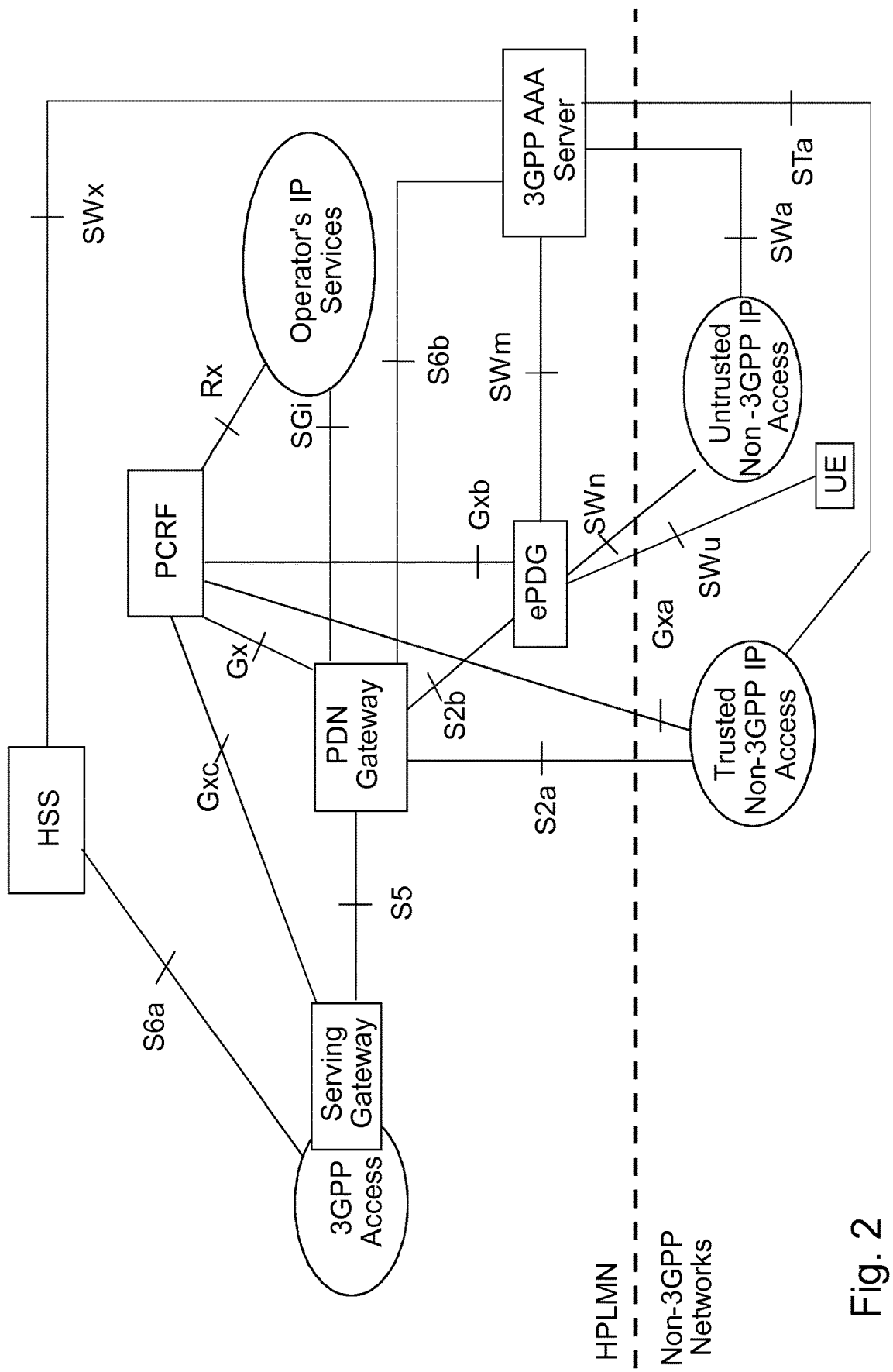
FIG. 2 is a schematic overview of an extension to the EPC architecture.
Figure 3:
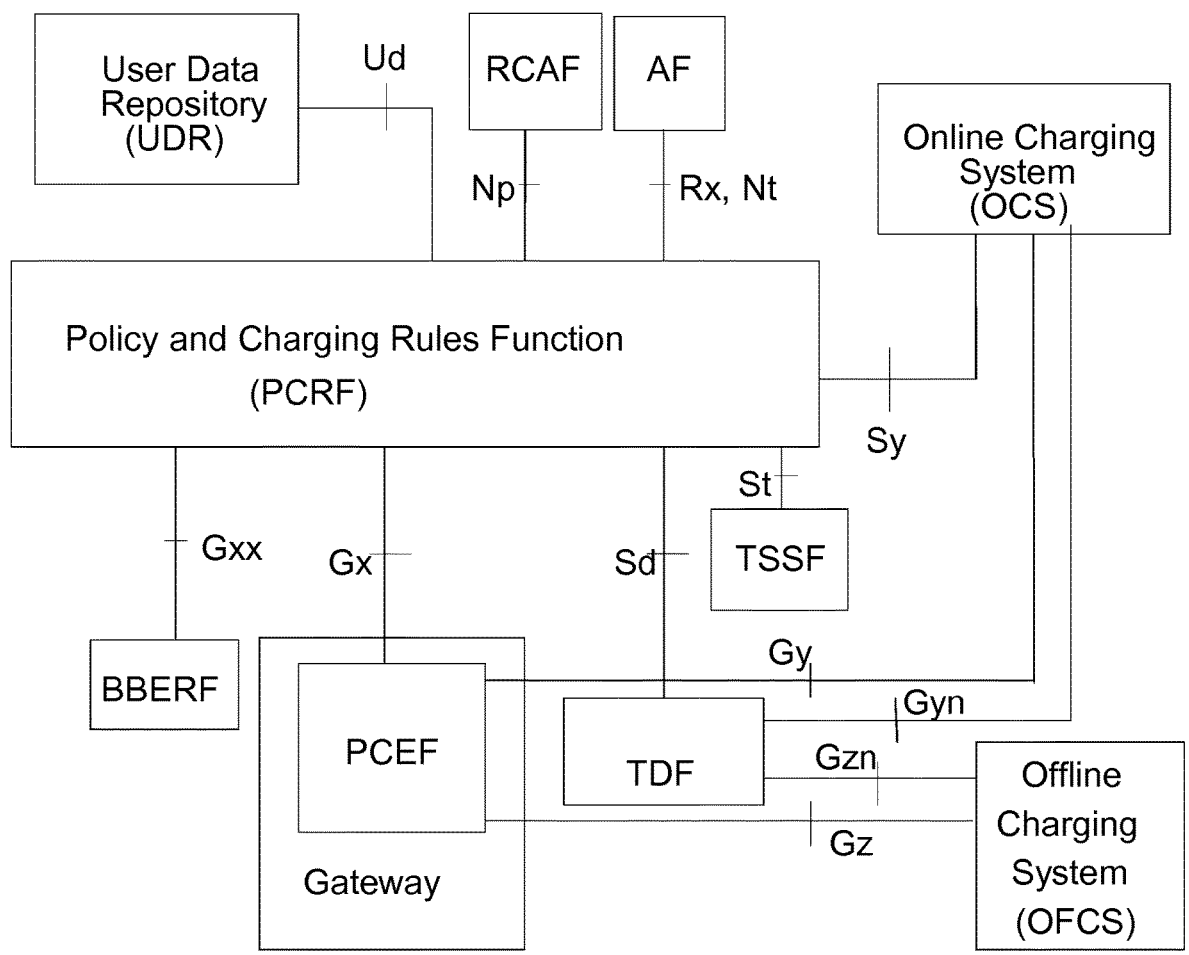
FIG. 3 is a schematic overview of a PCC architecture.
Figure 4:
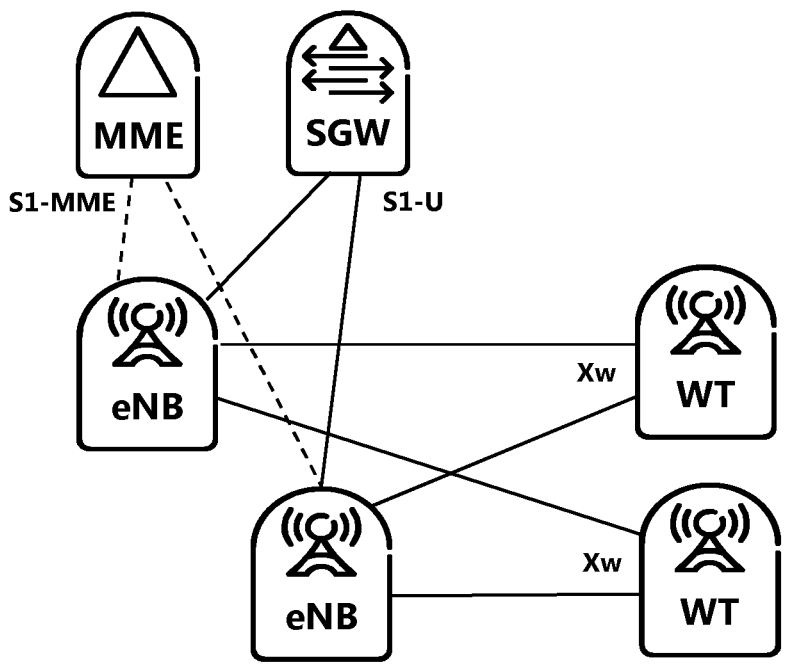
FIG. 4 is a schematic overview, illustrating LWA.
Figure 5:
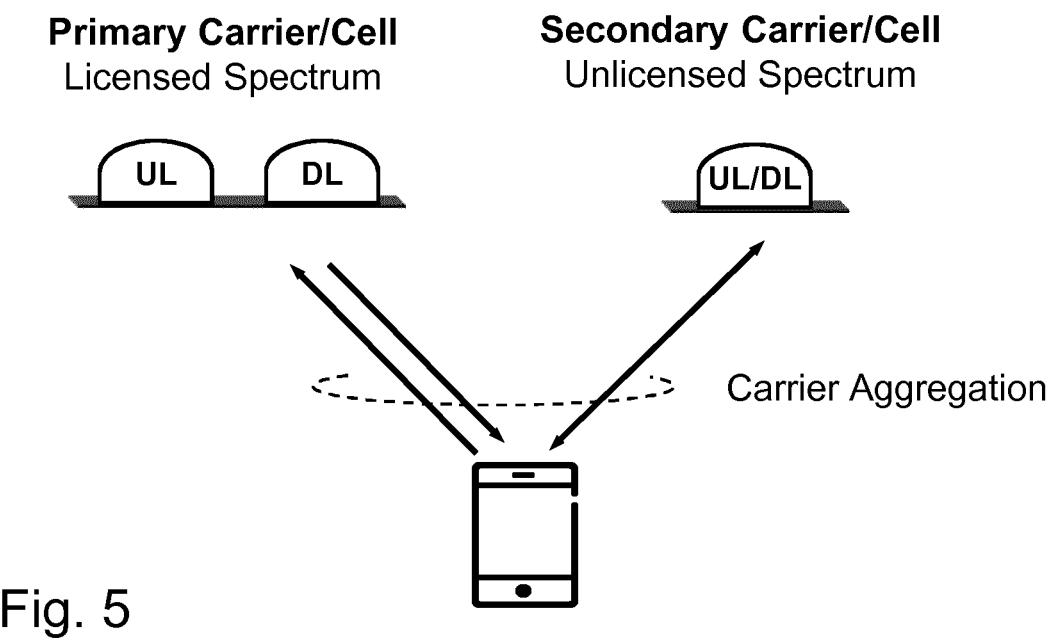
FIG. 5 is a schematic overview, illustrating LAA.
Figure 6:
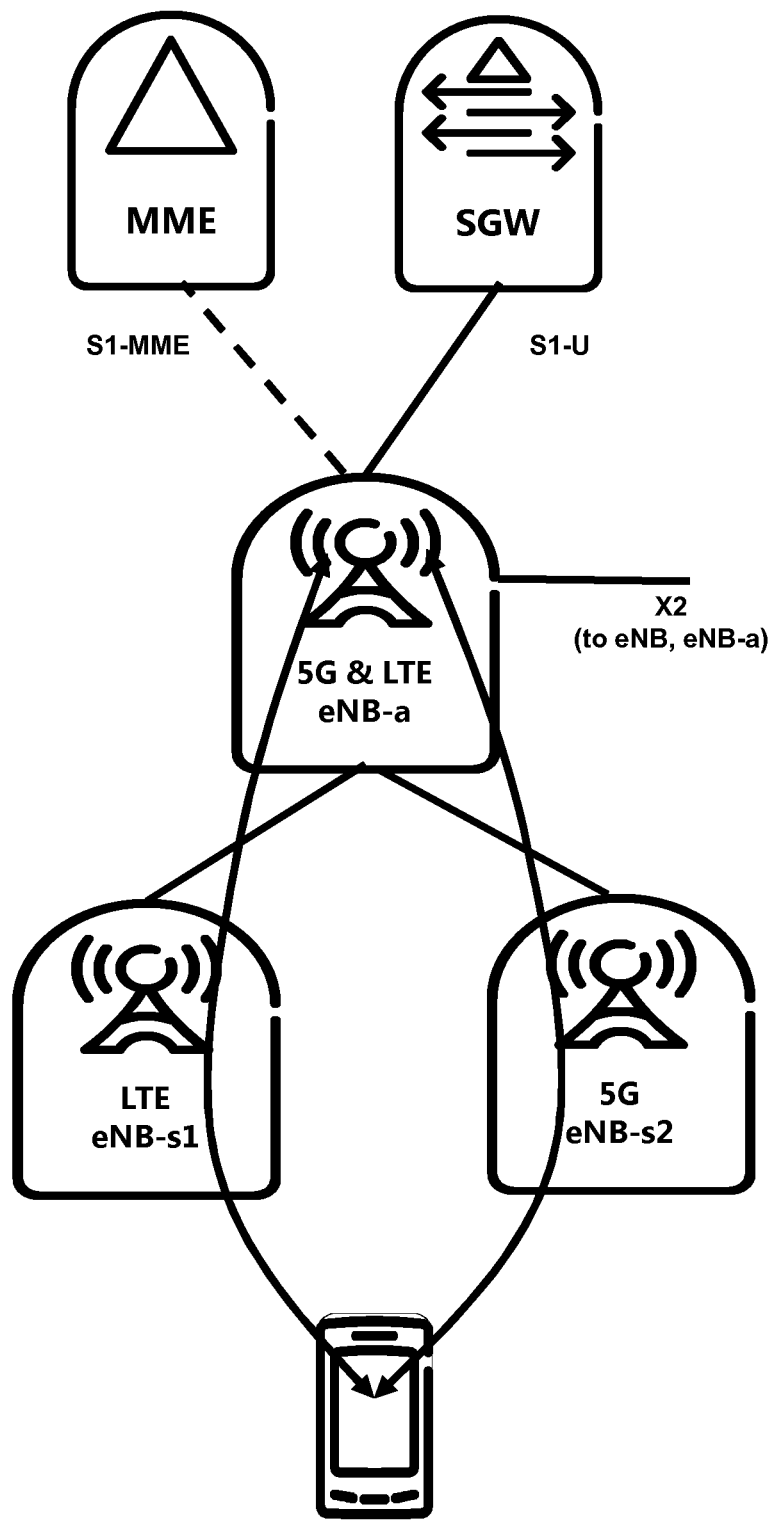
FIG. 6 is a schematic overview, illustrating tight integration in a 5G network.

Throughout the following description similar reference numerals have been used to denote similar features, such as nodes, actions, steps, modules, circuits, parts, items elements, units or the like, when applicable. In the Figures, features that appear in some embodiments are indicated by dashed lines.

In the following, APN, PDN connection, initial attach, APN, MME and HSS as functions and terms as in 2G/3G/

4G, but the present disclosure is also applicable to 5G core equivalents with appropriate 5G terminology.

Figure 7:
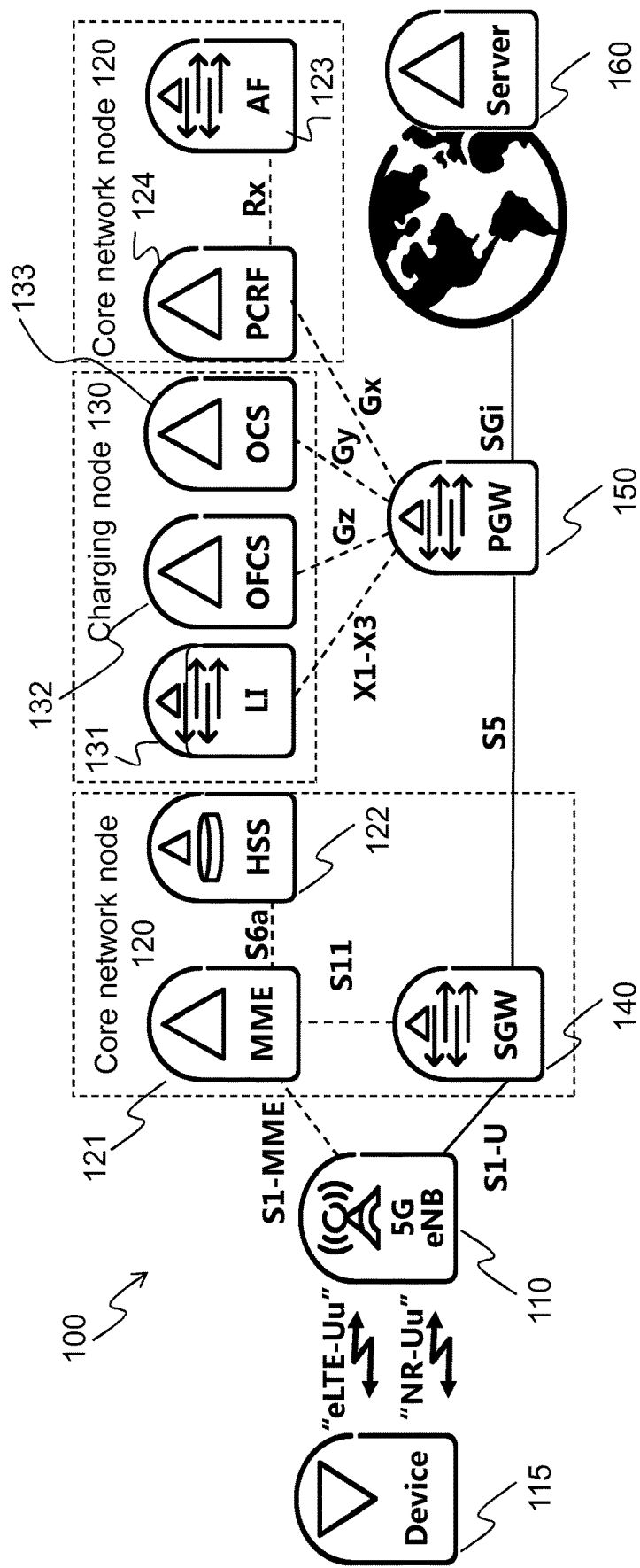
FIG. 7 is a schematic overview of an exemplifying network in which embodiments herein may be implemented.

FIG. 7 depicts an exemplifying network 100 in which embodiments herein may be implemented. In this example, the network 100 comprises a 5G eNB connected to a LTE network, e.g. LTE Frequency Division Duplex (FDD), LTE Time Division Duplex (TDD), LTE Half-Duplex Frequency Division Duplex (HD-FDD) or the like.

In other examples, the network 100 may be any cellular or wireless communication system, such as a Universal Mobile Telecommunication System (UMTS), Worldwide Interoperability for Microwave Access (WiMAX), LTE operating in an unlicensed and/or licensed band, or a Wideband Code Division Multiple Access (WCDMA), Universal Terrestrial Radio Access (UTRA) TDD, Ultra-Mobile Broadband (UMB), Global System for Mobile communications (GSM) network, GSM/Enhanced Data Rate for GSM Evolution (EDGE) Radio Access Network (GERAN) network, EDGE network, a network comprising of any combination of Radio Access Technologies (RATs) such as e.g. Multi-Standard Radio (MSR) base stations, multi-RAT base stations etc., any 3rd Generation Partnership Project (3GPP) cellular network, Wi-Fi networks, Worldwide Interoperability for Microwave Access (WiMax), 5G system or any cellular network or system.

The network 100 may be said to comprise a radio network node 110. The radio network node 110 may manage a first air interface, here denoted "eLTE-Uu", and a second air interface, here denoted "NR-Uu". In this example, the radio network node 110 may be a 5G eNB supporting tight integration between LTE evolution through the first air interface and NR (New Radio) through the second air interface.

The first and second air interfaces may be used for communication with a user equipment 115. The communication may include user transmissions and/or control transmissions. The user transmissions may include user data, payload data, content data etc. The control transmissions may include control information relating to e.g. scheduling, authentication, mobility, power control etc. The user transmissions are only relevant in case the first wireless device is in a cellular mode. The communication may include uplink transmission and/or downlink transmission. A transmission may be referred to as a data block.

As used herein, the term "radio network node" may refer to a Base Station System (BSS), a Radio Network Controller (RNC), a Radio Base Station (RBS), an evolved Node B (eNB), a 5G eNB, a control node controlling one or more Remote Radio Units (RRUs), an access point or the like.

As used herein, the term "user equipment" may refer to a wireless communication device, a machine-to-machine (M2M) device, an Internet-of-Things (IoT) device, a mobile phone, a cellular phone, a Personal Digital Assistant (PDA) equipped with radio communication capabilities, a smartphone, a laptop or personal computer (PC) equipped with an internal or external mobile broadband modem, a tablet PC with radio communication capabilities, a portable electronic radio communication device, a sensor device equipped with radio communication capabilities or the like. The sensor may be any kind of weather sensor, such as wind, temperature, air pressure, humidity etc. As further examples, the sensor may be a light sensor, an electronic or electric switch, a microphone, a loudspeaker, a camera sensor etc. Sometimes, the term "user" may be used to refer to the user equipment or the like as above. It shall be understood that the user may not necessarily involve a human user. The term "user" may also refer to a machine, a software component or the like using certain functions, methods and similar.

In FIG. 7, a core network node 120 is illustrated. The core network node 120 may comprise an MME 121, HSS 122, SGW 140, Application Function (AF) node 123 and/or PCRF node 124. Between the MME and the HSS there is communication via an S6a interface. This means e.g. that the core network node 120 may be an MME, an HSS, etc. or any other node that provides the same or similar functionality as described herein for the core network node 120. In particular, the core network node 120 may transmit the indication of a traffic steering policy toward the radio network node 110 via (or through) other core network nodes. Likewise, the core network node 120 may receive the access information from the radio network node 110 via (or through) other core network nodes. The AF has its common responsibilities and is not elaborated on here.

Moreover, the network 100 comprises a charging node 130. The charging node 130 may comprise one or more of a Lawful Interception (LI) node 131, an OFCS 132, an OCS 133 and a PCEF node (not illustrated). The PCEF node is a network node that includes PCEF functionality. In some examples, the LI 131 may be excluded as example of the charging node 130.

For example, the charging node 130 may be the PGW 150, which is typically considered a core network node, including the PCEF functionality. In such case, the charging node 130 may correspond to the PGW 150. In deployments where the PGW 150 does not include the PCEF, the PGW 150 may be considered a core network node 120 and a standalone PCEF node (not illustrated) may be considered the charging node 130.

The PCEF encompasses service data flow detection, policy enforcement and flow based charging functionalities by enforcing the PCC rules received from the PCRF via the Diameter Gx interface. In particular, the PCEF may be located at e.g. a gateway GPRS support node (GGSN) in a general packet radio service (GPRS) core network. The GPRS core network allows 2G, 3G and WCDMA mobile networks to transmit IP packets to external networks such as the Internet. Moreover, the PCEF may also be located at e.g. a packet data network gateway (PGW) in an evolved packet system (EPS) network. The PGW, which may also be abbreviated as PDN GW, is the point of interconnection between the evolved packet core (EPC) and the external IP networks. Furthermore, the PCEF may also be located at e.g. a packet data gateway (PDG) for connecting an untrusted WLAN network with a 3GPP network. In this scenario, the PDG may be a gateway to a specific packet data network, such as the internet or an operator service network.

The OFCS is responsible for offline charging functionality as described in the background section. Moreover, the OFCS may receive access information as described herein.

The OCS is responsible for online charging functionality as described in the background section. Moreover, the OCS may receive access information as described herein.

The Lawful Interception (LI) has its common responsibilities and is not elaborated on here.

Figure 18:
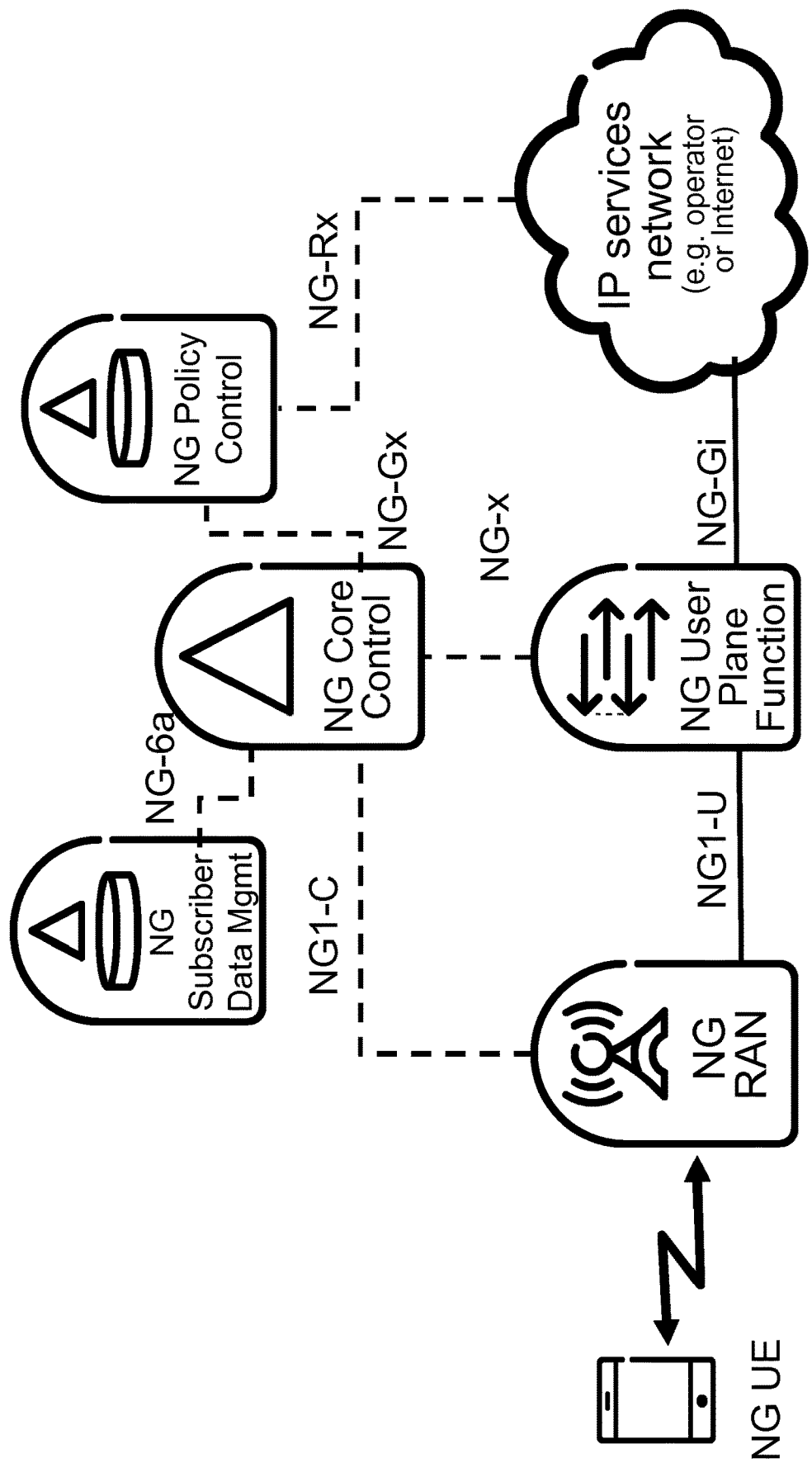
FIG. 18 is a schematic overview of an exemplifying 5G architecture.

In this example, the radio network node 110 is connected to the MME 121 and a Serving GateWay (SGW) 140, as examples of the core network node 120. In other examples, as shown in FIG. 18, the radio network node, shown as NG RAN in FIG. 18, is connected to the NG Core Control and to the NG User Plane Function, as an example of a 5G core network node.

Moreover, the SGW 140 is connected to a PGW 150.

FIG. 7 further illustrates a server 160 with which the user equipment 115 may communicate.

Before proceeding with a more detailed description of the embodiments herein, the embodiments may be summarized as providing functionality for offline and online charging. This is achieved by that the core network node 120 provides, to the radio network node 110, a traffic steering policy on which PDN connection and/or bearer and/or packet flow to use on Wi-Fi/cellular or licensed/unlicensed. The terms "Wi-Fi" and "WLAN" are used interchangeably herein. Upon applying the policy in the radio network node 110, i.e. in the RAN, the radio network node 110 provides to the core network node 120 so called access information indicating a currently used access resources, such as Radio Access Technology (RAT) or frequency type, i.e. licensed or unlicensed radio spectrum, for the PDN connection and/or bearer and/or packet flow under consideration. Particularly in the wording of PCC specifications, a packet flow may correspond to a service data flow. Possibly, in some examples, this kind of provisioning is only performed when the traffic of the user equipment is not on cellular access resource.

Figure 8:
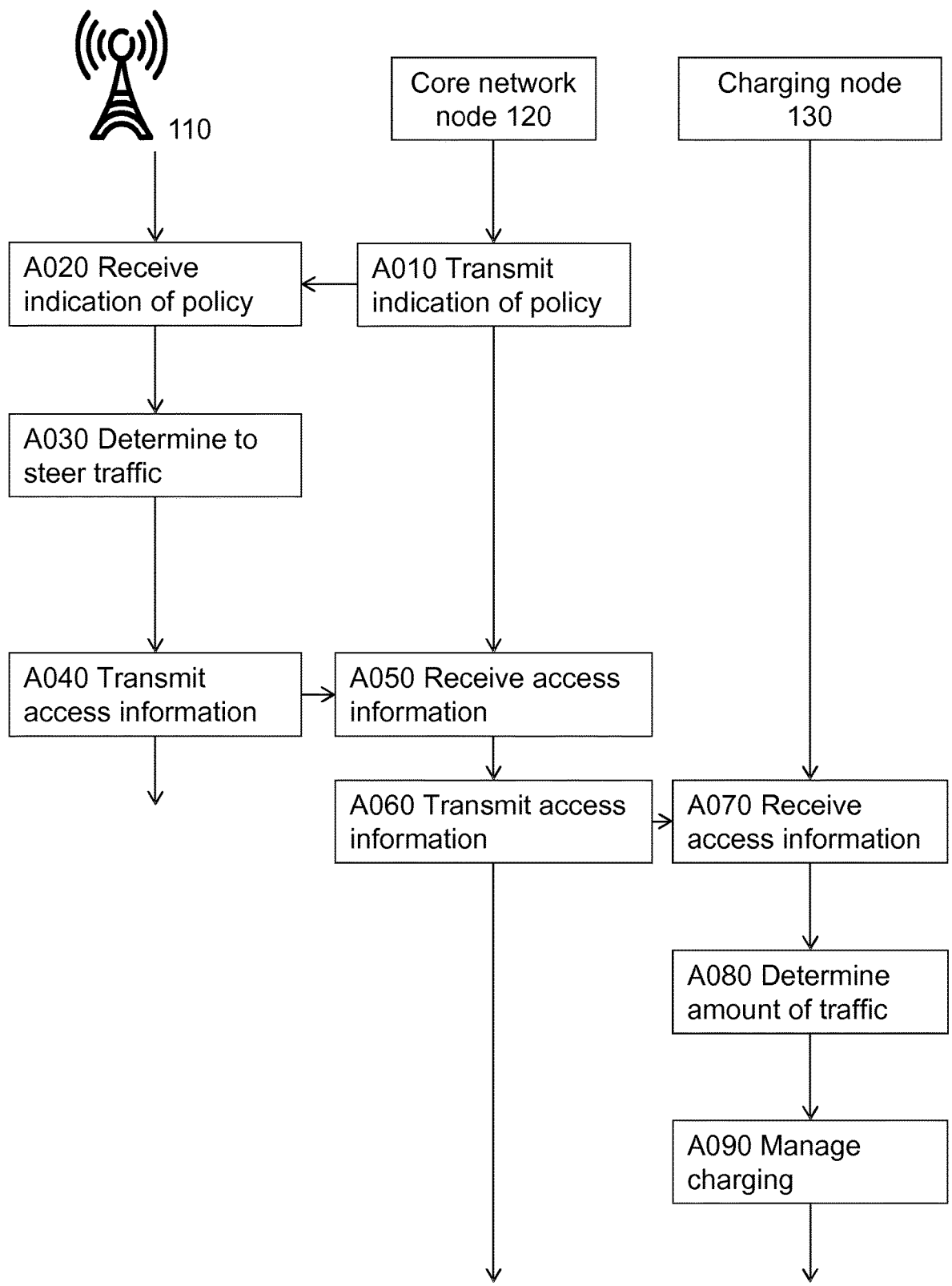
FIG. 8 is a combined signaling and flowchart illustrating the methods herein.

FIG. 8 illustrates an exemplifying method according to embodiments herein when implemented in the network 100 of FIG. 7.

The radio network node 110 performs a method for enabling management of a traffic steering policy relating to access resources for providing an access to the network 100 for the user equipment 115.

The core network node 120 performs a method for enabling management of a traffic steering policy relating to access resources for providing an access to the network 100 for the user equipment 115.

The charging node 130 performs a method for enabling management of a traffic steering policy relating to access resources for providing an access to the network 100 for a user equipment 115.

Initially, the traffic steering policy may be determined, in the core network, such as by the HSS, the PCRF, the MME, a Serving GPRS Support Node (SGSN, where GPRS stands for General Packet Radio Service, notably this node is not shown) or a combination, based on one or more of e.g. subscription data, operator configuration and the like.

The traffic steering policy indicates one or more access resources and at least one of a PDN connection, a packet flow and a bearer to use on the one or more access resources.

In some embodiments, the access resources comprise at least one of licensed radio spectrum resources, unlicensed radio spectrum resources and radio access technologies as outlined above. The radio access technologies may comprise one or more of a Wireless Local Area Network technology (WLAN, and also known as Wi-Fi) and Third Generation Partnership Project network technology and the like.

The traffic steering policy further indicates for one access resource, amongst the one or more access resources, whether the access resource is to be used on a per uplink and/or downlink basis. This means that the traffic steering policy may sometimes be used only for uplink access resources, only for downlink access resource or both uplink and downlink access resources.

As an example, the traffic steering policy may indicate that for a certain PDN connection WLAN shall preferably be used, or sometimes required to be used, if available; otherwise the PDN connection may be established over e.g. 3GPP licensed radio spectrum and/or unlicensed radio spectrum resources.

Further examples of traffic steering policies include e.g.:
PDN connection 1 (all bearers) allowed only on cellular
PDN connection 2 both cellular and Wi-Fi allowed
Bearer1 allowed only on cellular
Bearer2 allowed on cellular and Wi-Fi
Additional info whether uplink and downlink or only downlink/uplink is allowed on a particular access, e.g. only downlink on Wi-Fi
A specific packet flow allowed only on cellular
A specific packet flow allowed on both cellular and Wi-Fi
In the examples above, "allowed" may mean "preferred to be used" or "required to be used".

One or more of the following actions may be performed in any suitable order.

Action A010

Once the core network node 120 has become aware of the traffic steering policy, the core network node 120 transmits, to the radio network node 110, an indication of the traffic steering policy. In an embodiment, the core network node 120 may transmit to the radio network node 110 the traffic steering policy, whereas in another embodiment further commented, a number of traffic steering policies may be configured in the radio network node 110 and the core network node 120 may transmit the indication that identifies one of them.

In relation to the transmission of the indication of the traffic steering policy there is a control plane embodiment and a user plane embodiment.

In the control plane embodiment, the indication of the traffic steering policy is transmitted from the core network node 120 via control plane signaling.

Whereas in the user plane embodiment, the indication of the traffic steering policy is transmitted from the core network node 120 via signaling through user plane by means of packet marking. Packet marking is well known technology within network technologies.

Action A020

Subsequent to action A010, the radio network node 110 receives, from the core network node 120, the indication of the traffic steering policy. In this manner, the core network node 120 provides the traffic steering policy to the radio network node 110 to inform about which PDN connections and/or bearers and/or packet flows to use on Wi-Fi (WLAN)/cellular or licensed/unlicensed.

In some examples, the traffic steering policy is provisioned into the RAN, instead of being received from the core network node 120, if there is no need to differentiate the traffic steering policy based on e.g. subscriber information or the like. Action A020 thus generally means that the radio network node 110 may obtain the traffic steering policy. The traffic steering policy may be obtained by reception from the core network node 120 or by retrieval from a memory, e.g. local or remote memory, accessible by the radio network node 110, into which memory the traffic steering policy has been provisioned.

Action A030

Now that the radio network node 110 has obtained the traffic steering policy, the radio network node 110 determines to steer traffic of the user equipment 115 for the at least one of the PDN connection, the packet flow and the bearer, through the one or more access resources. In this manner, the radio network node 110 applies the traffic steering policy e.g. depending on changes of available access resources. This means for example that when the radio network node 110 detects that a WLAN is available, the radio network node 110 may need to determine to steer, or not to steer, the traffic through the WLAN as given by the traffic steering policy. As mentioned, the traffic may be steered on a per PDN connection, per bearer, per packet flow basis.

Action A040

The radio network node 110 transmits access information to the core network node 120, the access information indicates a currently used access resource, amongst the one or more access resources, for the PDN connection, the packet flow or the bearer.

In relation to the transmission of the access information, the control plane embodiment above and the user plane embodiment above may also apply.

Thus, for the control plane embodiment, the access information is transmitted to the core network node 120 via control plane signaling, whereas for the user plane embodiment, the access information is transmitted to the core network node 120 via signaling through user plane by means of packet marking. However, in some examples the control plane embodiment may be applied for the indication of traffic steering policy and the user plane embodiment may be applied for the access information or the control plane embodiment may be applied for and the user plane embodiment may be applied for the indication of traffic steering policy.

In this manner, the radio network node 110 may inform the core network node 120 when there is a change of access resource as determined by the radio network node 110. For example, the radio network node 110 may inform when a particular PDN connection, bearer, packet flow or set of packet flows is moved to Wi-Fi and when the particular PDN connection, bearer, packet flow or set of packet flows is moved back to cellular. In some cases, it may be assumed that a default rule may be that the particular PDN connection/bearer/packet flow is on cellular. In these cases, the radio network node 110 need only to inform the core network node 120 when the traffic is not on cellular, e.g.

Bearer2 downlink on Wi-Fi or,

Bearer2 downlink previously on Wi-Fi but now moved back to cellular

Action A050

Subsequent to action A040, the core network node 120 receives the access information from the radio network node 110. As mentioned, the access information indicates a currently used access resource, amongst the one or more access resources, for a PDN connection, packet flow or bearer.

When the core network node corresponds to a PCRF node 124, the reception of the access information may trigger determining new or modified PCC rules to be installed towards the PCEF node, which in particular might be the PGW 150, for identification and treatment of the corresponding traffic.

Action A060

Since the core network node 120 now is aware of the access information, the core network node 120 transmits, to the charging node 130, the access information indicating the currently used access resource for the PDN connection, packet flow or bearer. As commented above, the core network node receiving the access information from the radio network node may transmit the access information towards the charging node through other core network node.

For example, in an embodiment, a core network node such as the SGW 140 may receive the access information via S1-U interface and transmit said access information through other core network nodes such as PGW 150 and PCRF node 124 towards the charging node 130. Particularly in this embodiment, the PGW 150 of the core network may include the PCEF functionality and, upon receiving the access information at the PCRF node 124, the PCRF node may transmit the access information in the form of, or along with, PCC rules to the PGW 150 with PCEF functionality, which is now considered the charging node 130, so that the latter can manage the appropriate charging.

The access information may be reformatted before it is sent to the charging node 130, but the actual information provided with the access information is at any rate forwarded by the core network node 120 towards the charging node 130.

As mentioned above, when the core network node 120 is a PCRF node 124 and the charging node 130 is a PGW 150 with PCEF functionality, the access information may be transmitted in an amended RA-Request message or in an amended CC-Answer through the Gx reference point.

Action A070

Subsequent to action A070, the charging node 130 receives, from the core network node 120, the access information, which may be used in action A080.

Action A080

Now that the charging node 130 is aware of the access information, the charging node 130 determines an amount of traffic for the PDN connection, packet flow or bearer on the currently used access resource, e.g. by use of the access information that indicates the currently used access resource.

Action A090

Since the charging node 130 has counted the amount of traffic for the access resource indicated by the access information, the charging node 130 manages charging with respect to the user equipment 115 based on the determined amount of traffic on the currently used access resource. That is, an exemplary PCEF node, standalone node or included in PGW 150, communicates the determined amount of traffic towards the OFCS 132, if offline charging applies, or towards the OCS 133 if online charging applies.

Advantageously, the charging node 130 may thus charge subscribers according to their usage of access resource e.g. on a per PDN connection, bearer, packet flow basis.

As compared to the PCC architectures in the background sections, it may be noted that the embodiments herein provide e.g. knowledge about used bearer at the core network node 120, e.g. the PGW, and consequently in turn at the PCEF responsible for measuring the user plane traffic for charging purposes.

A further advantage of at least some embodiment herein may be that operator are able to charge usage over licensed and unlicensed access separately, e.g. because operators do not own the unlicensed spectrum and it may be difficult to guarantee the same end-user quality of experience in unlicensed as in licensed spectrum. Sometimes this may be required by regulations as per different regions, such as countries or jurisdictions.

Figure 9:
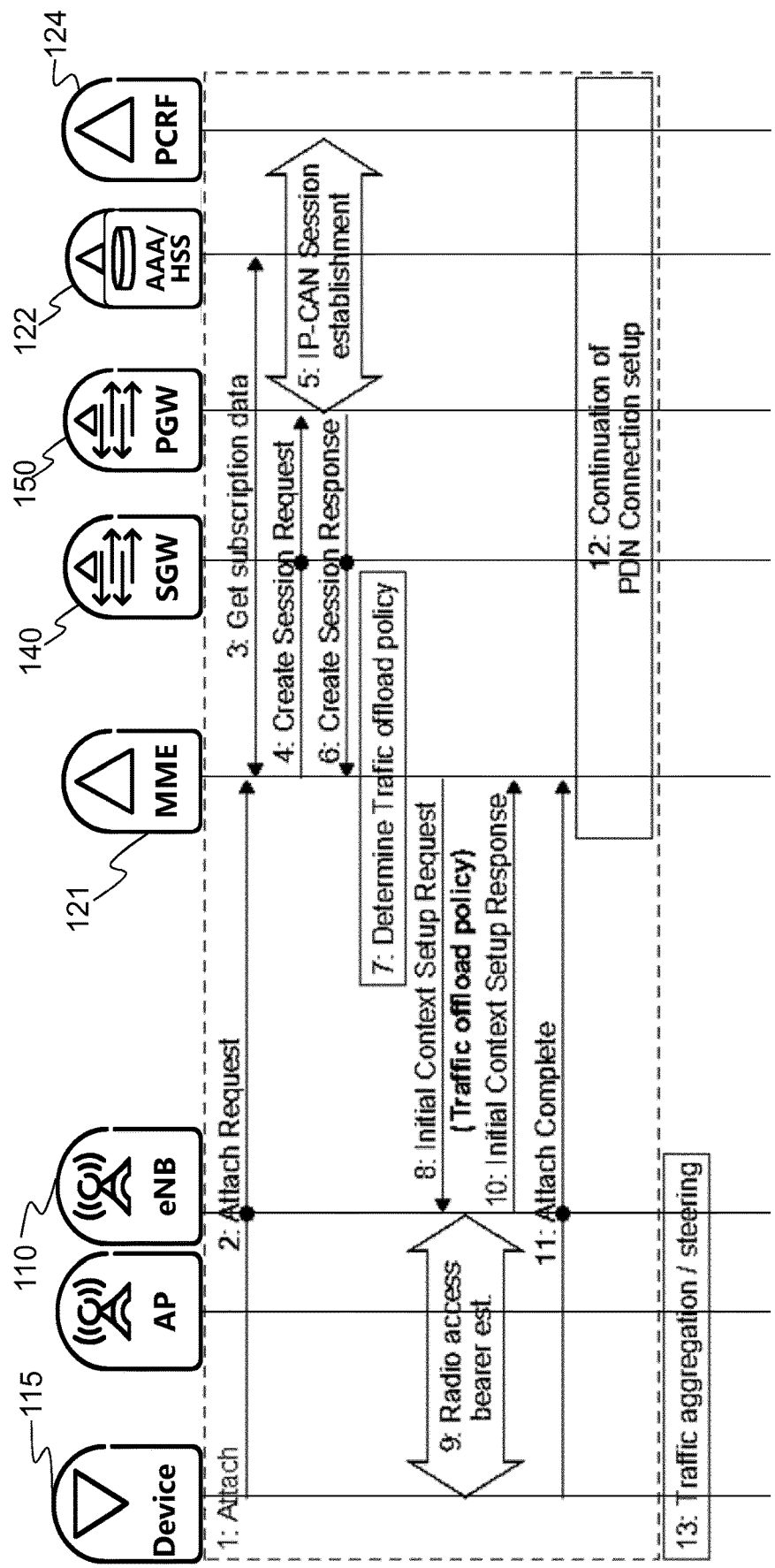
FIGS. 9-11 are combined signaling and flowcharts, illustrating various embodiments herein.

FIG. 9 illustrates further embodiments of the methods herein in more detail. These embodiments include examples on how to provide the traffic steering policy from an MME 121 to the radio network node 110, such as eNB, when the initial context is setup.

Action 1

The user equipment 115, also denoted "Device", triggers (Initial) Attach procedure towards the network, such as the radio network node 110. This action may include RRC connection establishment between the user equipment 115 and the radio network node 110. The user equipment 115 also sends the NAS Attach Request message to the radio network node 110.

Action 2

The radio network node 110 selects an MME 121 for the user equipment 115 to attach to and sends the NAS Attach Request message to the MME 121. The NAS message may be included in a S1AP INITIAL UE MESSAGE.

Action 3

The MME 121 retrieves subscription data for the user equipment 115 from the Authorization and Accounting (AAA)/HSS 122.

Action 4

The MME 121 selects both a SGW 140 and a PGW 150 and sends a Create Session Request message to the selected SGW 140 including different information for example about the EPS bearers to be created and information about the selected PGW 150. The SGW 140 sends a Create Session Request message to the selected PGW 150.

Action 5

The IP-CAN Session establishment procedure is performed between the PGW 150 and the PCRF 124.

Action 6

The PGW 150 sends a Create Session Response message back to the SGW 140, and the SGW 140 sends a Create Session Response message back to the MME 121.

Action 7

The MME 121 determines the traffic steering policy, traffic offload policy, based on e.g. subscription data, e.g. received in action 3, operator policy from PCRF 124, e.g. received in actions 5-6, or local policies, i.e. accessible by the MME 121 from a local or remote memory.

Action 8

The MME 121 provides the traffic steering policy to the radio network node 110 in the S1AP INITIAL CONTEXT SETUP REQUEST message. This action may be similar to action A010 and A020. This means that the indication of the traffic steering policy may be provided by means of the S1AP INITIAL CONTEXT SETUP REQUEST message or similar message.

Action 9

The radio access bearers, i.e. different from the EPS bearers, which EPS bearers often are referred to as 'bearer' herein, are created between the radio network node 110 and the user equipment 115.

Action 10

The radio network node 110 sends a S1AP INITIAL CONTEXT SETUP RESPONSE message to the MME 121.

Action 11

The user equipment 115 sends a NAS Attach complete message to the MME 121, via the radio network node 110.

Action 12

Remaining PDN connection setup procedure actions are performed according to known manners.

Action 13

The radio network node 110 applies the traffic steering policy when performing LWA, LWIP or LAA procedures to steer/route traffic between radio network node 110 and user equipment 115. The traffic steering policy can also be applied by a "5G radio network node 110" when performing tight integration between LTE Evolution and NR. This action may be similar to action A030 above.

Figure 10:
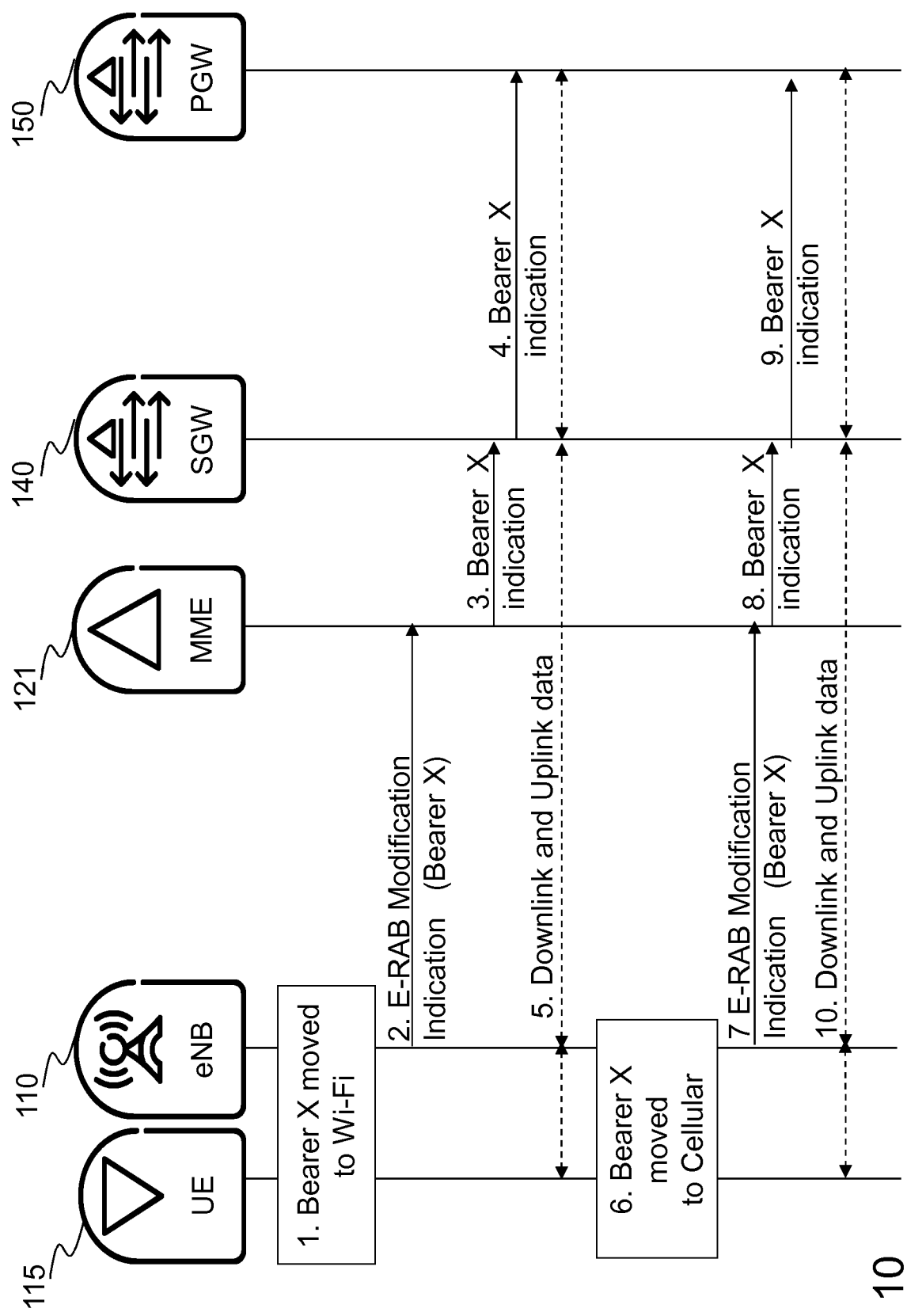

FIG. 10 illustrates examples of further embodiments of the methods herein.

One or more of the following actions may be performed.

Action 1

When for example the radio network node 110 has detected a Wi-Fi and/or found that load on cellular is high, the radio network node 110, such as RAN, moves a bearer from cellular to Wi-Fi. This action may be similar to action A030 above.

Action 2

In order to make the core network node 120, such as the MME 121, aware of that the bearer has been moved the radio network node 110 sends information about the move of the bearer to the MME 121. The information about the move may be similar to the access information mentioned above in relation to FIG. 8. Accordingly, this action may be similar to action A040 above.

Action 3

The MME 121 forwards the information about the move, i.e. the access information, to the SGW 140. This action may be similar to action A050 and A060 above.

Action 4

Furthermore, the SGW 140 forwards the information about the move, i.e. the access information, to the PGW 150.

Action 5

Downlink and/or uplink data, such as payload, user data, control data etc, may be transferred to/from the user equipment 115 on the currently used, or selected, access resource.

Action 6

The radio network node 110 moves a bearer from Wi-Fi to cellular. This action may be similar to action A030 above.

Action 7

The radio network node 110 sends an E-RAB Modification, which may carry the access information, in order to inform the MME 121 about the move of the bearer. This action may be similar to action A040.

Action 8

When the MME 121 receives the E-RAB Modification, the MME 121 forwards the access information to the SGW 140.

Action 9

Next, the SGW 140 forwards the access information to the PGW 150.

Action 10

As in action 5, downlink and/or uplink data, such as payload, user data, control data etc., may be transferred to/from the user equipment 115 on the currently used, or selected, access resource.

It shall be noted that the core network node 120, such as the MME 121, forwards the access information to the PGW 150 through the SGW 140. Thus, the access information is made available for charging purposes. The flow of FIG. 10 may also be applicable for multiple bearers, but the above scenario illustrates only one bearer for reasons of simplicity of description.

Figure 11:
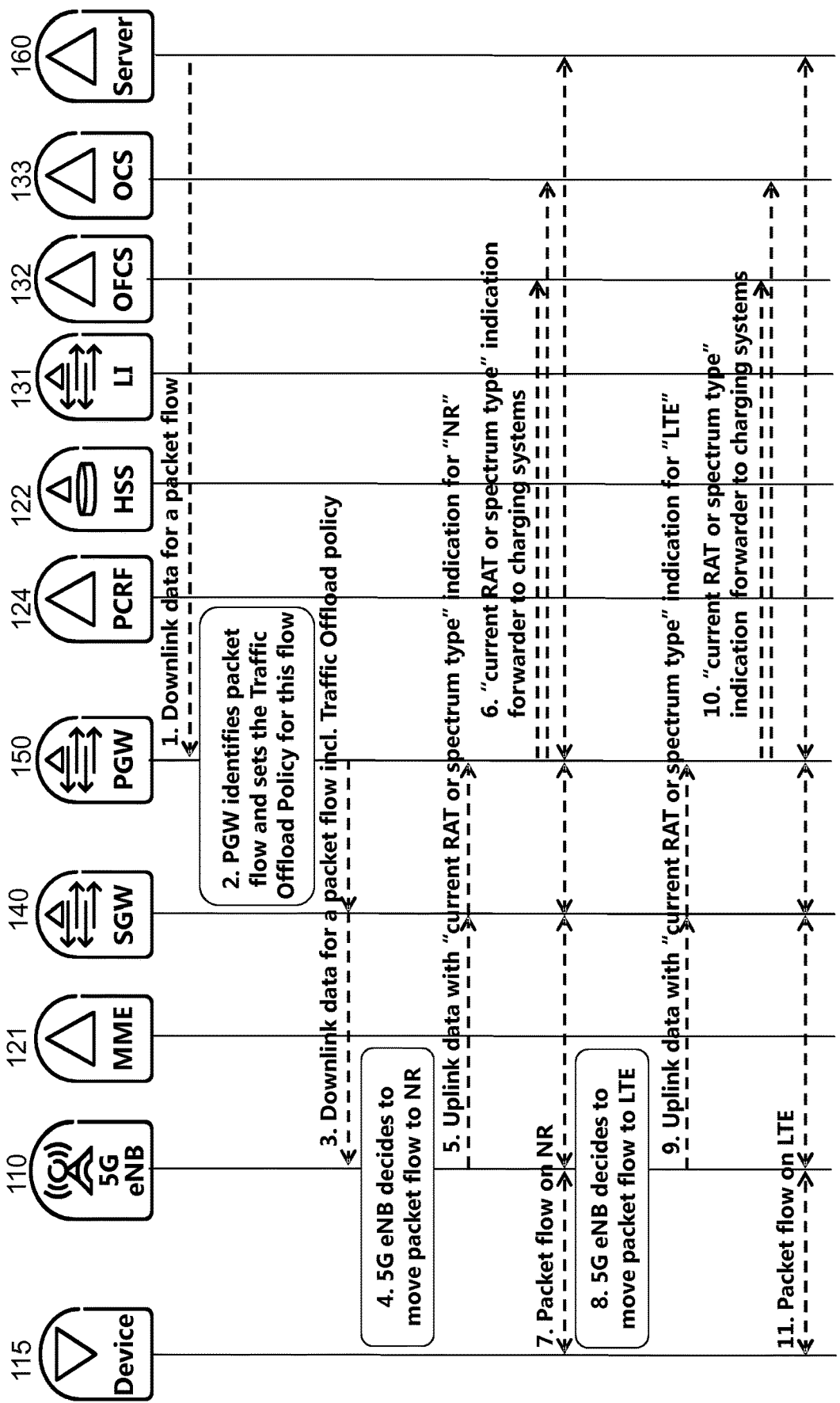

FIG. 11 shows an example of an embodiment implementing packet marking in the user plane for a case when the radio network node 110 is a 5G eNB that performs tight integration between LTE evolution and NR. This example is given for a downlink packet flow, but example may also be applied for uplink packet flows. This example is further directed towards when the traffic steering policy is applied on a per packet flow basis. This means that the traffic steering policy and the access resource indicating on which RAT or spectrum type a specific packet flow shall be transmitted and/or received on are sent "inband" in the user plane, while using packet marking.

One or more of the following actions may be performed.

Action 1

The PGW 150 receives a downlink data for a packet flow.

Action 2

Next, the PGW 150 identifies the packet flow and sets the traffic steering policy. Action 1 and 2 can be based on information received from other nodes, such as the PCRF 124, which may transmit dynamic PCC rules, and the MME 121. Additionally or alternatively, the actions 1 and/or 2 may be partly based on information configured in the PGW 150, such as static PCC rules configured in the PCEF implemented at the PGW 150.

Action 2 may also be performed for example by the SGW 140 or by another node on "SGi-interface".

Action 3

The downlink data for the packet flow is forwarded to the radio network node 110 and the traffic steering policy is included by means of packet marking. This action may be similar to action A010 and/or A020.

Action 4

The radio network node 110 decides to move the packet flow to NR access. That is to say, the radio network node 110 may move the packet flow from one access resource to another access resource, such as from LTE to 5G, i.e. different RATs. This action may be similar to action A030.

Action 5

The radio network node 110 indicates to the core network node 120, such as the SGW 140 and the PGW 150, in the user plane that the specified packet flow has been moved to NR access. This action may be similar to action A040, where the access information is provided by means of packet marking.

Action 6

The PGW 150 informs the charging node 130, such as the OFCS 132 and/or the OCS 133, about the currently used access resource, such as currently used RAT or currently used radio spectrum type, i.e. unlicensed or licensed radio spectrum. The PGW 150 may also count and report accumulated amount of usage for the currently used access resource, the PGW 150 thus corresponding to the charging node 130 as commented above. This action may be similar to action A060 and/or A070.

Action 7

The packet flow is now on an access resource that is NR access.

Action 8

The radio network node 110 decides to move the packet flow to the LTE access, i.e. another access resource than the currently used NR access. This action may be similar to action A030.

Action 9

The radio network node 110 indicates to the core network 120, such as the SGW 140 and/or the PGW 150, in the user plane that the specified packet flow has been moved to LTE access. This action may be similar to action A040 and/or A050.

Action 10

The PGW 150 informs the charging node 130, such as the OFCS 132 and the OCS 133, about the current RAT or spectrum type used and may report accumulated usage, the PGW 150 thus corresponding to the charging node 130 as commented above. See also action 6 directly above. This action may be similar to action A060 and/or A070. This action may be similar to action A060.

Action 11

The packet flow is now on LTE access, as an example of access resource.

The actions 6 and 10 may also be performed separately from this call flow, e.g. in case the CDRs (for offline charging) or usage report and quota request (for online charging) is triggered separately from the movement of the flows. Although the figure shows that the access information is sent to both the OFCS 132 and the OCS 133, it is typically sent only to one of these nodes (for example based on the subscription type of the end user and/or the charging method applied for a specific APN).

The control plane and user plane embodiments are summarized here.

In the control plane embodiments, the core network node informs the radio network node about the traffic steering policy using control plane signaling when the PDN connections and/or bearers and/or packet flows are created in RAN. The access information from the radio network node to the core network node about which access resource is being used is also performed using control plane signaling.

In the user plane embodiments, the traffic steering policy is included as a packet marking solution i.e. as part of user plane transmissions and may apply for the packet flow for which the packet marking is included. The packet marking performed by PGW based on information from e.g. HSS, MME/SGSN and PCRF. The access information from the radio network node to the core network node(s) may also be performed in a similar way i.e. using packet marking solutions.

Figure 12:
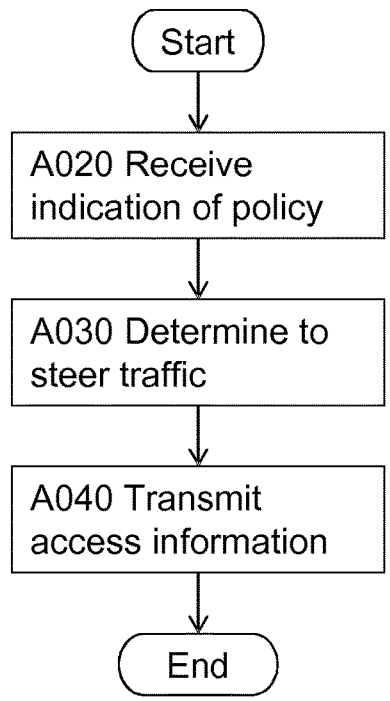
FIG. 12 is a flowchart illustrating embodiments of the method in the radio network node.

In FIG. 12, a schematic flowchart of exemplifying methods in the radio network node 110 is shown. The same reference numerals as above have been used to denote the same or similar features, in particular the same reference numerals have been used to denote the same or similar actions. Accordingly, the radio network node 110 performs a method for enabling management of a traffic steering policy relating to access resources for providing an access to a network 100 for a user equipment 115.

One or more of the following actions may be performed in any suitable order.

Action A020

The radio network node 110 receives, from a core network node 120, an indication of the traffic steering policy. The traffic steering policy indicates one or more access resources and at least one of a Packet Data Network "PDN" connection, a packet flow and a bearer to use on the one or more access resources.

In some embodiments of the method, the access resources comprise at least one of licensed radio spectrum resources, unlicensed radio spectrum resources and radio access technologies.

In some embodiments of the method, the radio access technologies comprise one or more of a Wireless Local Area Network technology and Third Generation Partnership Project network technology.

In some embodiments of the method, the traffic steering policy further indicates for one access resource, amongst the one or more access resources, whether the access resource is to be used on a per uplink and/or downlink basis.

In some embodiments of the method, the indication of the traffic steering policy is received from the core network node 120 via control plane signaling.

In some embodiments of the method, the indication of the traffic steering policy is received from the core network node 120 via signaling through user plane by means of packet marking.

Action A030

The radio network node 110 determines to steer traffic of the user equipment 115 for the at least one of the PDN connection, the packet flow and the bearer, through the one or more access resources.

Action A040

The radio network node 110 transmits access information to the core network node 120. The access information indicates a currently used access resource, amongst the one or more access resources, for the PDN connection, the packet flow or the bearer.

In some embodiments of the method, the access information is transmitted to the core network node 120 via control plane signaling.

In some embodiments of the method, the access information is transmitted to the core network node 120 via signaling through user plane by means of packet marking.

Figure 13:
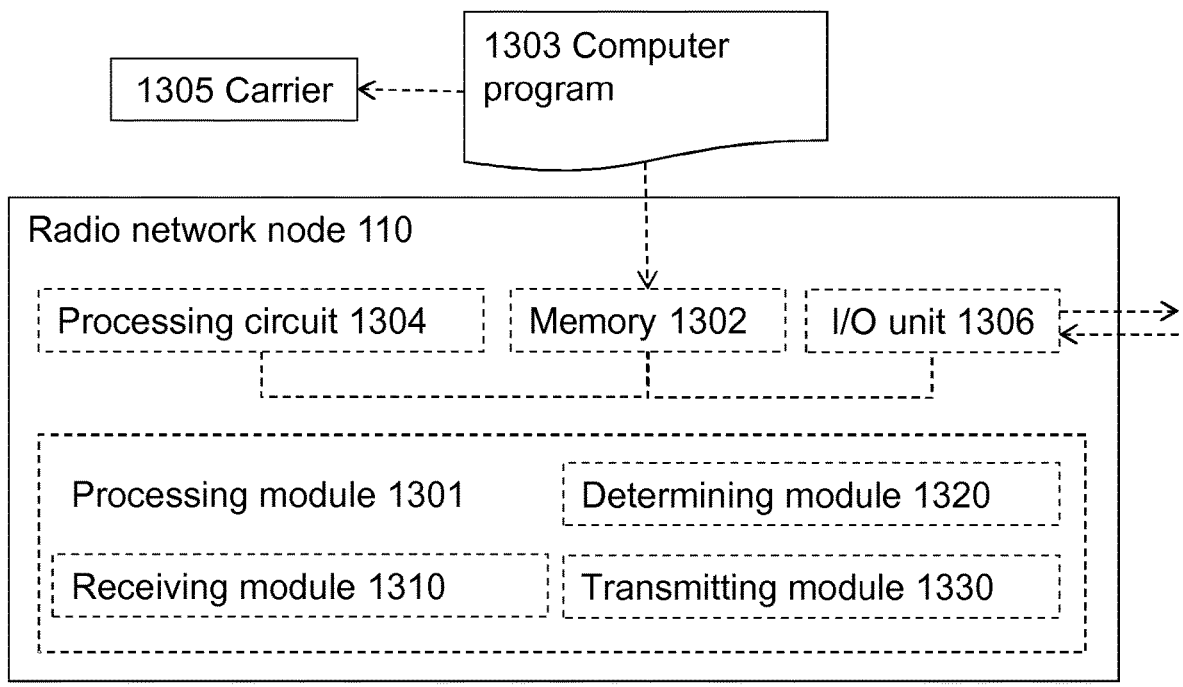
FIG. 13 is a block diagram illustrating embodiments of the radio network node.

With reference to FIG. 13, a schematic block diagram of embodiments of the radio network node 110 of FIG. 1 is shown.

The radio network node 110 may comprise a processing module 1301, such as a means for performing the methods described herein. The means may be embodied in the form of one or more hardware modules and/or one or more software modules The radio network node 110 may further comprise a memory 1302. The memory may comprise, such as contain or store, instructions, e.g. in the form of a computer program 1303, which may comprise computer readable code units.

According to some embodiments herein, the radio network node 110 and/or the processing module 1301 comprises a processing circuit 1304 as an exemplifying hardware module. Accordingly, the processing module 1301 may be embodied in the form of, or 'realized by', the processing circuit 1304. The instructions may be executable by the processing circuit 1304, whereby the radio network node 110 is operative to perform the methods of one or more of FIGS. 8-12. As another example, the instructions, when executed by the radio network node 110 and/or the processing circuit 1304, may cause the radio network node 110 to perform the method according to one or more of FIGS. 8-12.

In view of the above, in one example, there is provided a radio network node 110 for enabling management of a traffic steering policy relating to access resources for providing an access to the network 100 for the user equipment 115. Again, the memory 1302 contains the instructions executable by said processing circuit 1304 whereby said radio network node 110 is operative for:

receiving, from a core network node 120, an indication of the traffic steering policy, wherein the traffic steering policy indicates one or more access resources and at least one of a PDN connection, a packet flow and a bearer to use on the one or more access resources, determining to steer traffic of the user equipment 115 for the at least one of the PDN connection, the packet flow and the bearer, through the one or more access resources, and transmitting access information to the core network node 120, wherein the access information indicates a currently used access resource, amongst the one or more access resources, for the PDN connection, the packet flow or the bearer.

FIG. 13 further illustrates a carrier 1305, or program carrier, which comprises the computer program 1303 as described directly above.

In some embodiments, the processing module 1301 comprises an Input/Output module 1306, which may be exemplified by a receiving module and/or a transmitting module as described below when applicable.

In further embodiments, the radio network node 110 and/or the processing module 1301 may comprise one or more of a receiving module 1310, a determining module 1320, and a transmitting module 1330 as exemplifying hardware modules. In other examples, one or more of the aforementioned exemplifying hardware modules may be implemented as one or more software modules.

Accordingly, the radio network node 110 is configured for enabling management of a traffic steering policy relating to access resources for providing an access to a network 100 for a user equipment 115.

Therefore, according to the various embodiments described above, the radio network node 110 and/or the processing module 1301 and/or the receiving module 1310 is configured for receiving, from a core network node 120, an indication of the traffic steering policy. The traffic steering policy indicates one or more access resources and at least one of a PDN connection, a packet flow and a bearer to use on the one or more access resources.

Furthermore, the radio network node 110 and/or the processing module 1301 and/or the determining module 1320 may be configured for determining to steer traffic of the user equipment 115 for the at least one of the PDN connection, the packet flow and the bearer, through the one or more access resources.

Moreover, the radio network node 110 and/or the processing module 1301 and/or the transmitting module 1330 may be configured for transmitting access information to the core network node 120. The access information indicates a currently used access resource, amongst the one or more access resources, for the PDN connection, the packet flow or the bearer.

In some embodiments of the radio network node 110, the access resources comprise at least one of licensed radio spectrum resources, unlicensed radio spectrum resources and radio access technologies.

In some embodiments of the radio network node 110, the radio access technologies comprise one or more of a Wireless Local Area Network technology and Third Generation Partnership Project network technology.

In some embodiments of the radio network node 110, the traffic steering policy further indicates for one access resource, amongst the one or more access resources, whether the access resource is to be used on a per uplink and/or downlink basis.

In some embodiments of the radio network node 110, the indication of the traffic steering policy is received from the core network node 120 via control plane signaling.

In some embodiments of the radio network node 110, the access information is transmitted to the core network node 120 via control plane signaling.

In some embodiments of the radio network node 110, the indication of the traffic steering policy is received from the core network node 120 via signaling through user plane by means of packet marking.

In some embodiments of the radio network node 110, the access information is transmitted to the core network node 120 via signaling through user plane by means of packet marking.

Figure 14:
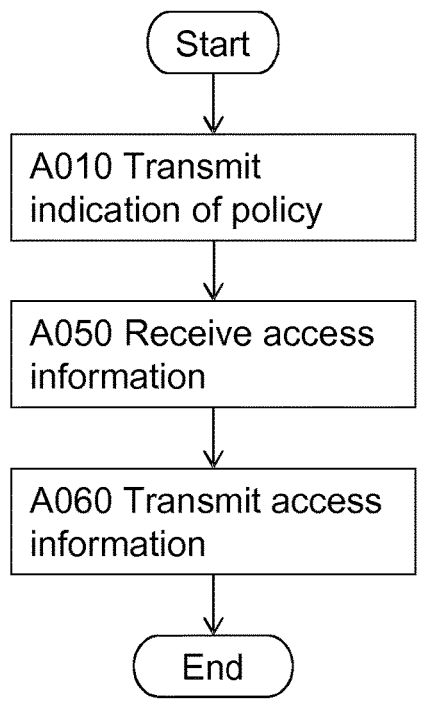
FIG. 14 is a flowchart illustrating embodiments of the method in the core network node.

In FIG. 14, a schematic flowchart of exemplifying methods in the core network node 120 is shown. Again, the same reference numerals as above have been used to denote the same or similar features, in particular the same reference numerals have been used to denote the same or similar actions. Accordingly, the core network node 120 performs a method for enabling management of a traffic steering policy relating to access resources for providing an access to a network 100 for a user equipment 115.

One or more of the following actions may be performed in any suitable order.

Action A010

The core network node 120 transmits, toward a radio network node 110, an indication of a traffic steering policy. The traffic steering policy indicates one or more access resources and at least one of a PDN connection, a packet flow and a bearer to use on the one or more access resources.

Action A050

The core network node 120 receives access information originated from the radio network node 110. The access information indicates a currently used access resource, amongst the one or more access resources, for a PDN connection, packet flow or bearer.

Action A060

The core network node 120 transmits, to one of a charging node and a further core network node, the access information indicating the currently used access resource for the PDN connection, packet flow or bearer.

In some embodiments of the method, the access resources comprise at least one of licensed radio spectrum resources, unlicensed radio spectrum resources and radio access technologies.

In some embodiments of the method, the radio access technologies comprise one or more of a Wireless Local Area Network technology and Third Generation Partnership Project network technology.

In some embodiments of the method, the traffic steering policy further indicates for one access resource, amongst the one or more access resources, whether the access resource is to be used on a per uplink and/or downlink basis.

In some embodiments of the method, the indication of the traffic steering policy is transmitted by the core network node 120 via control plane signaling.

In some embodiments of the method, the access information is received by the core network node 120 via control plane signaling.

In some embodiments of the method, the indication of the traffic steering policy is transmitted by the core network node 120 via signaling through user plane by means of packet marking.

In some embodiments of the method, the access information is received by the core network node 120 via signaling through user plane by means of packet marking.

Figure 15:
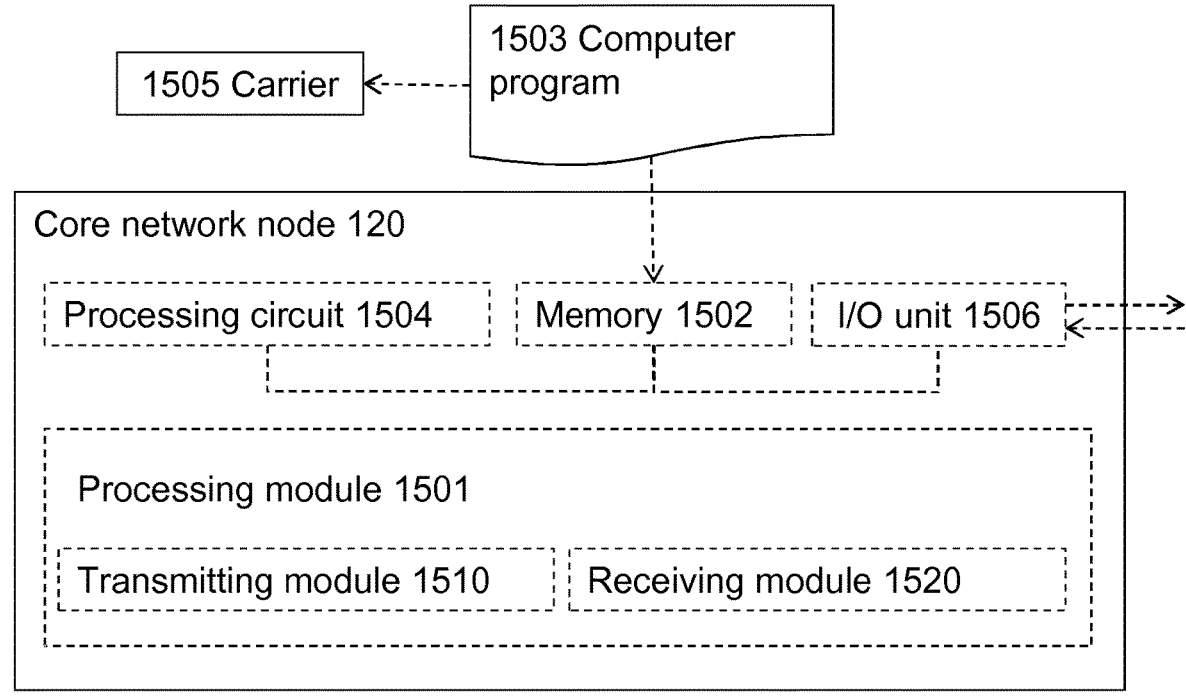
FIG. 15 is a block diagram illustrating embodiments of the core network node.

With reference to FIG. 15, a schematic block diagram of embodiments of the core network node 120 of FIG. 1 is shown.

The core network node 120 may comprise a processing module 1501, such as a means for performing the methods described herein. The means may be embodied in the form of one or more hardware modules and/or one or more software modules The core network node 120 may further comprise a memory 1502. The memory may comprise, such as contain or store, instructions, e.g. in the form of a computer program 1503, which may comprise computer readable code units.

According to some embodiments herein, the core network node 120 and/or the processing module 1501 comprises a processing circuit 1504 as an exemplifying hardware module. Accordingly, the processing module 1501 may be embodied in the form of, or 'realized by', the processing circuit 1504. The instructions may be executable by the processing circuit 1504, whereby the core network node 120 is operative to perform the methods of one or more of FIGS. 8-11 and/or FIG. 14. As another example, the instructions, when executed by the core network node 120 and/or the processing circuit 1504, may cause the core network node 120 to perform the method according to one or more of FIGS. 8-11 and/or FIG. 14.

In view of the above, in one example, there is provided a core network node 120 for enabling management of a traffic steering policy relating to access resources for providing an access to a network 100 for the user equipment 115. Again, the memory 1502 contains the instructions executable by said processing circuit 1504 whereby said core network node 120 is operative for:

transmitting, toward a radio network node 110, an indication of a traffic steering policy, wherein the traffic steering policy indicates one or more access resources and at least one of a PDN connection, a packet flow and a bearer to use on the one or more access resources, receiving access information originated from the radio network node 110, wherein the access information indicates a currently used access resource, amongst the one or more access resources, for a PDN connection, packet flow or bearer, and transmitting, to one of a charging node and a further core network node, the access information indicating the currently used access resource for the PDN connection, packet flow or bearer.

FIG. 15 further illustrates a carrier 1505, or program carrier, which comprises the computer program 1503 as described directly above.

In some embodiments, the processing module 1501 comprises an Input/Output module 1506, which may be exemplified by a receiving module and/or a sending module as described below when applicable.

In further embodiments, the core network node 120 and/or the processing module 1501 may comprise one or more of a transmitting module 1510, and a receiving module 1520 as exemplifying hardware modules. In other examples, one or more of the aforementioned exemplifying hardware modules may be implemented as one or more software modules.

Accordingly, the core network node 120 is configured for enabling management of a traffic steering policy relating to access resources for providing an access to a network 100 for a user equipment 115.

Therefore, according to the various embodiments described above, the core network node 120 and/or the processing module 1501 and/or the transmitting module 1510 is configured for transmitting, toward a radio network node 110, an indication of a traffic steering policy. The traffic steering policy indicates one or more access resources and at least one of a PDN connection, a packet flow and a bearer to use on the one or more access resources.

Moreover, the core network node 120 and/or the processing module 1501 and/or the receiving module 1520 is configured for receiving access information originated from the radio network node 110. The access information indicates a currently used access resource, amongst the one or more access resources, for a PDN connection, packet flow or bearer.

Furthermore, the core network node 120 and/or the processing module 1501 and/or the transmitting module 1510, or a further transmitting module (not shown) is configured for transmitting, to one of the charging node 130 and a further core network node, the access information indicating the currently used access resource for the PDN connection, packet flow or bearer.

In some embodiments, the access resources comprise at least one of licensed radio spectrum resources, unlicensed radio spectrum resources and radio access technologies.

In some embodiments, the radio access technologies comprise one or more of a Wireless Local Area Network technology and Third Generation Partnership Project network technology.

In some embodiments, the traffic steering policy further indicates for one access resource, amongst the one or more access resources, whether the access resource is to be used on a per uplink and/or downlink basis.

In some embodiments, the core network node 120 and/or the processing module 1501 and/or the transmitting module 1510, or a yet further transmitting module (not shown) is configured for transmitting the indication of the traffic steering policy via control plane signaling.

In some embodiments, the core network node 120 and/or the processing module 1501 and/or the receiving module 1520, or a further receiving module (not shown) is configured for receiving the access information via control plane signaling.

In some embodiments, the core network node 120 and/or the processing module 1501 and/or the transmitting module 1510, or a yet further transmitting module (not shown) is configured for transmitting the indication of the traffic steering policy via signaling through user plane by means of packet marking.

In some embodiments, the core network node 120 and/or the processing module 1501 and/or the receiving module 1520, or a yet further receiving module (not shown) is configured for receiving the access information via signaling through user plane by means of packet marking.

Figure 16:
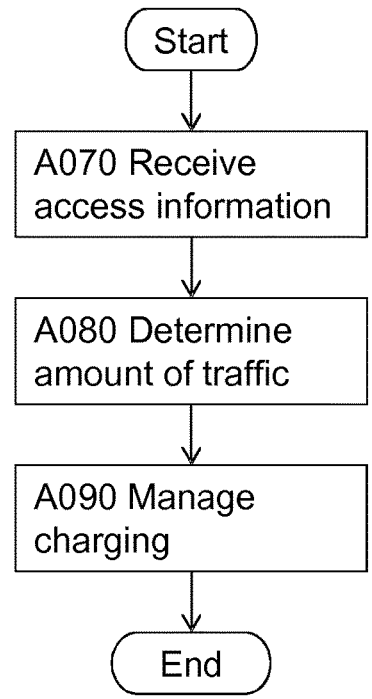
FIG. 16 is a flowchart illustrating embodiments of the method in the charging node.

In FIG. 16, a schematic flowchart of exemplifying methods in the charging node 130 is shown. Again, the same reference numerals as above have been used to denote the same or similar features, in particular the same reference numerals have been used to denote the same or similar actions. Accordingly, the charging node 130 performs a method for enabling management of a traffic steering policy relating to access resources for providing an access to a network 100 for a user equipment 115.

One or more of the following actions may be performed in any suitable order.

Action A070

The charging node 130 receives, from a core network node 120, access information indicating a currently used access resource for a PDN connection, packet flow or bearer.

Action A080

The charging node 130 determines an amount of traffic for the PDN connection, packet flow or bearer on the currently used access resource.

Action A090

The charging node 130 manages charging with respect to the user equipment 115 based on the determined amount of traffic on the currently used access resource.

In some embodiments of the method, the charging node 130 is a network node performing a Policy and Charging Enforcement function in communication with at least one of an Offline Charging System 131 and an Online Charging System 132.

In some embodiments of the method, the access resources comprise at least one of licensed radio spectrum resources, unlicensed radio spectrum resources and radio access technologies.

In some embodiments of the method, the radio access technologies comprise one or more of a Wireless Local Area Network technology and Third Generation Partnership Project network technology.

In some embodiments of the method, the traffic steering policy further indicates for one access resource, amongst the one or more access resources, whether the access resource is to be used on a per uplink and/or downlink basis.

In some embodiments of the method, the access information is received by the charging node 130 via control plane signaling.

In some embodiments of the method, the access information is received by the charging node 130 via signaling through user plane by means of packet marking.

Figure 17:
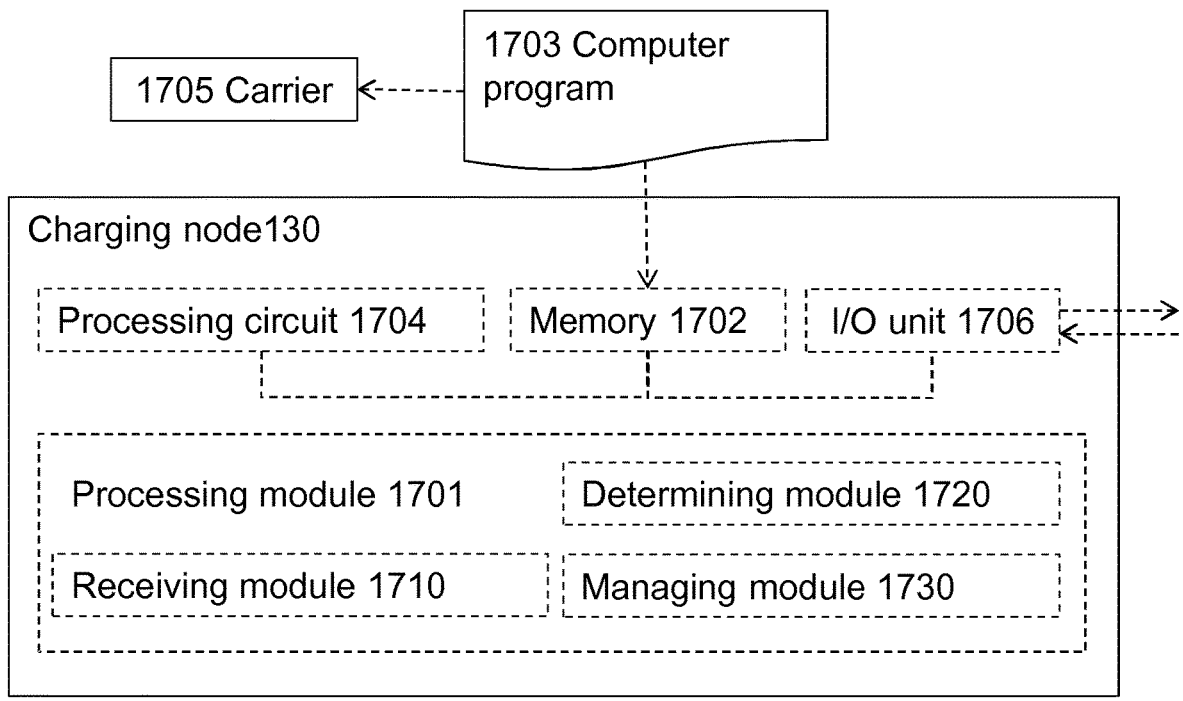
FIG. 17 is a block diagram illustrating embodiments of the charging node.

With reference to FIG. 17, a schematic block diagram of embodiments of the charging node 130 of FIG. 1 is shown.

The charging node 130 may comprise a processing module 1701, such as a means for performing the methods described herein. The means may be embodied in the form of one or more hardware modules and/or one or more software modules The charging node 130 may further comprise a memory 1702. The memory may comprise, such as contain or store, instructions, e.g. in the form of a computer program 1703, which may comprise computer readable code units.

According to some embodiments herein, the charging node 130 and/or the processing module 1701 comprises a processing circuit 1704 as an exemplifying hardware module. Accordingly, the processing module 1701 may be embodied in the form of, or 'realized by', the processing circuit 1704. The instructions may be executable by the processing circuit 1704, whereby the charging node 130 is operative to perform the methods of one or more of FIGS. 8-11 and/or FIG. 16. As another example, the instructions, when executed by the charging node 130 and/or the processing circuit 1704, may cause the charging node 130 to perform the method according to one or more of FIGS. 8-11 and/or FIG. 16.

In view of the above, in one example, there is provided a charging node 130 for enabling management of a traffic steering policy relating to access resources for providing an access to a network 100 for the user equipment 115. Again, the memory 1702 contains the instructions executable by said processing circuit 1704 whereby said charging node 130 is operative for:

receiving, from a core network node 120, access information indicating a currently used access resource for a PDN connection, packet flow or bearer, determining an amount of traffic for the PDN connection, packet flow or bearer on the currently used access resource, and managing charging with respect to the user equipment 115 based on the determined amount of traffic on the currently used access resource.

FIG. 17 further illustrates a carrier 1705, or program carrier, which comprises the computer program 1703 as described directly above.

In some embodiments, the processing module 1701 comprises an Input/Output module 1706, which may be exemplified by a receiving module and/or a sending module as described below when applicable.

In further embodiments, the charging node 130 and/or the processing module 1701 may comprise one or more of a receiving module 1710, a determining module 1720, and a managing module 1730 as exemplifying hardware modules. In other examples, one or more of the aforementioned exemplifying hardware modules may be implemented as one or more software modules.

Accordingly, the charging node 130 is configured for enabling management of a traffic steering policy relating to access resources for providing an access to a network 100 for a user equipment 115.

Therefore, according to the various embodiments described above, the charging node 130 and/or the processing module 1701 and/or the receiving module 1710 is configured for receiving, from a core network node 120, access information indicating a currently used access resource for a PDN connection, packet flow or bearer.

Furthermore, the charging node 130 and/or the processing module 1701 and/or the determining module 1720 is configured for determining an amount of traffic for the PDN connection, packet flow or bearer on the currently used access resource.

Moreover, the charging node 130 and/or the processing module 1701 and/or the managing module 1730 is configured for managing charging with respect to the user equipment 115 based on the determined amount of traffic on the currently used access resource.

In some embodiments of the charging node 130, the charging node 130 is a network node performing a Policy and Charging Enforcement function in communication with at least one of an Offline Charging System 131 and an Online Charging System 132.

In some embodiments of the charging node 130, the access resources comprise at least one of licensed radio spectrum resources, unlicensed radio spectrum resources and radio access technologies.

In some embodiments of the charging node 130, the radio access technologies comprise one or more of a Wireless Local Area Network technology and Third Generation Partnership Project network technology.

In some embodiments of the charging node 130, the traffic steering policy further indicates for one access resource, amongst the one or more access resources, whether the access resource is to be used on a per uplink and/or downlink basis.

Furthermore, the following information is provided to facilitate understanding and implementation of the embodiments herein.

FIG. 18 shows a functional network architecture for an exemplifying 5G core network.

The network architecture includes a Next Generation (NG) UE, an NG RAN, an NG User Plane Function, an NG Subscriber Data Management, an NG Core Control, an NG Policy Control. The NG UE is connected to the NG RAN. An NG core network is divided into four different functions; the NG Core Control handles the control and signaling plane, the NG user plane function handles user plane, the NG Subscriber Data Management handles subscriptions, possibly somewhat similar to HSS, the NG Policy Control is the function corresponding to PCRF. Notably, in context of charging, the NG Policy Control connects to the NG Core Control and an IP services network.

As used herein, the term "node", or "network node", may refer to one or more physical entities, such as devices, apparatuses, computers, servers or the like. This may mean that embodiments herein may be implemented in one physical entity. Alternatively, the embodiments herein may be implemented in a plurality of physical entities, such as an arrangement comprising said one or more physical entities, i.e. the embodiments may be implemented in a distributed manner, such as on a set of server machines of a cloud system.

As used herein, the term "module" may refer to one or more functional modules, each of which may be implemented as one or more hardware modules and/or one or more software modules and/or a combined software/hardware module in a node. In some examples, the module may represent a functional unit realized as software and/or hardware of the node.

As used herein, the term "computer program carrier", "program carrier", or "carrier", may refer to one of an electronic signal, an optical signal, a radio signal, and a computer readable medium. In some examples, the computer program carrier may exclude transitory, propagating signals, such as the electronic, optical and/or radio signal. Thus, in these examples, the computer program carrier may be a non-transitory carrier, such as a non-transitory computer readable medium.

As used herein, the term "processing module" may include one or more hardware modules, one or more software modules or a combination thereof. Any such module, be it a hardware, software or a combined hardware-software module, may be a determining means, estimating means, capturing means, associating means, comparing means, identification means, selecting means, receiving means, sending means or the like as disclosed herein. As an example, the expression "means" may be a module corresponding to the modules listed above in conjunction with the Figures.

As used herein, the term "software module" may refer to a software application, a Dynamic Link Library (DLL), a software component, a software object, an object according to Component Object Model (COM), a software component, a software function, a software engine, an executable binary software file or the like.

As used herein, the term "processing circuit" may refer to a processing unit, a processor, an Application Specific integrated Circuit (ASIC), a Field-Programmable Gate Array (FPGA) or the like. The processing circuit or the like may comprise one or more processor kernels.

As used herein, the expression "configured to/for" may mean that a processing circuit is configured to, such as adapted to or operative to, by means of software configuration and/or hardware configuration, perform one or more of the actions described herein.

As used herein, the term "action" may refer to an action, a step, an operation, a response, a reaction, an activity or the like. It shall be noted that an action herein may be split into two or more sub-actions as applicable. Moreover, also as applicable, it shall be noted that two or more of the actions described herein may be merged into a single action.

As used herein, the term "memory" may refer to a hard disk, a magnetic storage medium, a portable computer diskette or disc, flash memory, random access memory (RAM) or the like. Furthermore, the term "memory" may refer to an internal register memory of a processor or the like.

As used herein, the term "computer readable medium" may be a Universal Serial Bus (USB) memory, a DVD-disc, a Blu-ray disc, a software module that is received as a stream of data, a Flash memory, a hard drive, a memory card, such as a MemoryStick, a Multimedia Card (MMC), Secure Digital (SD) card, etc. One or more of the aforementioned examples of computer readable medium may be provided as one or more computer program products.

As used herein, the term "computer readable code units" may be text of a computer program, parts of or an entire binary file representing a computer program in a compiled format or anything there between.

As used herein, the expression "transmit" and "send" are considered to be interchangeable. These expressions include transmission by broadcasting, uni-casting, group-casting and the like. In this context, a transmission by broadcasting may be received and decoded by any authorized device within range. In case of uni-casting, one specifically addressed device may receive and decode the transmission. In case of group-casting, a group of specifically addressed devices may receive and decode the transmission.

As used herein, the terms "number" and/or "value" may be any kind of digit, such as binary, real, imaginary or rational number or the like. Moreover, "number" and/or "value" may be one or more characters, such as a letter or a string of letters. "Number" and/or "value" may also be represented by a string of bits, i.e. zeros and/or ones.

As used herein, the term "set of" may refer to one or more of something. E.g. a set of devices may refer to one or more devices, a set of parameters may refer to one or more parameters or the like according to the embodiments herein.

As used herein, the expression "in some embodiments" has been used to indicate that the features of the embodiment described may be combined with any other embodiment disclosed herein.

Further, as used herein, the common abbreviation "e.g.", which derives from the Latin phrase "exempli gratia," may be used to introduce or specify a general example or examples of a previously mentioned item, and is not intended to be limiting of such item. If used herein, the common abbreviation "i.e.", which derives from the Latin phrase "id est," may be used to specify a particular item from a more general recitation. The common abbreviation "etc.", which derives from the Latin expression "et cetera" meaning "and other things" or "and so on" may have been used herein to indicate that further features, similar to the ones that have just been enumerated, exist.

Even though embodiments of the various aspects have been described, many different alterations, modifications and the like thereof will become apparent for those skilled in the art. The described embodiments are therefore not intended to limit the scope of the present disclosure.

The invention claimed is:

1. A method, performed by a radio network node, for enabling management of a traffic steering policy relating to access resources for providing an access to a network for a user equipment, the method comprising:
    receiving, from a core network node, an indication of the traffic steering policy, the traffic steering policy indicating at least one access resource and at least one of: a Packet Data Network (PDN) connection, a packet flow and a bearer to use on the at least one access resource, the traffic steering policy differentiating between uplink and downlink when indicating the at least one access resource;
    determining to steer traffic of the user equipment for the at least one of: the PDN connection, the packet flow, and the bearer, through the at least one access, resource; and
    transmitting access information to the core network node, the access information indicating a currently used access resource amongst among the at least one access resource, for the at least one of: the PDN connection, the packet flow, and the bearer.

2. The method according to claim 1, wherein the access resources comprise at least one of: licensed radio spectrum resources, unlicensed radio spectrum resources, and radio access technologies.

3. A method, performed by a core network node, for enabling management of a traffic steering policy relating to access resources for providing an access to a network for a user equipment, the method comprising:
    transmitting, toward a radio network node, an indication of the traffic steering policy, the traffic steering policy indicating at least one access resource and at least one of: a Packet Data Network (PDN) connection, a packet flow, and a bearer to use on the at least one access resource, the traffic steering policy differentiating between uplink and downlink when indicating the at least one access resource;
    receiving access information originated from the radio network node, the access information indicating a currently used access resource, amongst the at least one access resource, for the at least one of: the PDN connection, packet flow, and bearer; and
    transmitting, to one of a charging node and a further core network node, the access information indicating the currently used access resource for the at least one of: the PDN connection, packet flow, and bearer.

4. The method according to claim 3, wherein the access resources comprise at least one of: licensed radio spectrum resources, unlicensed radio spectrum resources, and radio access technologies.

5. A method, performed by a charging node, for enabling management of a traffic steering policy relating to access resources for providing an access to a network for a user equipment, the method comprising:
    receiving, from a core network node, access information indicating a currently used access resource for one of: a Packet Data Network (PDN) connection, packet flow, and bearer according to the traffic steering policy, the traffic steering policy differentiating between uplink and downlink when indicating the currently used access resource;
    determining an amount of traffic for the one of: the PDN connection, packet flow, and bearer on the currently used access resource; and
    managing charging with respect to the user equipment based on the determined amount of traffic on the currently used access resource.

6. The method according to claim 5, wherein the charging node is a network node performing a Policy and Charging Enforcement function in communication with at least one of an Offline Charging System and an Online Charging System.

7. The method according to claim 5, wherein the access resources comprise at least one of: licensed radio spectrum resources, unlicensed radio spectrum resources, and radio access technologies.

8. A radio network node configured for enabling management of a traffic steering policy relating to access resources for providing an access to a network for a user equipment, the radio network node being configured for:
    receiving, from a core network node, an indication of the traffic steering policy, the traffic steering policy indicating at least one access resource and at least one of: a Packet Data Network (PDN) connection, a packet flow, and a bearer to use on the at least one access-resource, the traffic steering policy differentiating between uplink and downlink when indicating the at least one access resource;
    determining to steer traffic of the user equipment for the at least one of: the PDN connection, the packet flow, and the bearer, through the at least one access resource; and
    transmitting access information to the core network node, the access information indicating a currently used access resource amongst among the at least one access resource, for the at least one of: the PDN connection, the packet flow, and the bearer.

9. The radio network node according to claim 8, wherein the access resources comprise at least one of: licensed radio spectrum resources, unlicensed radio spectrum resources, and radio access technologies.

10. A core network node configured for enabling management of a traffic steering policy relating to access resources for providing an access to a network for a user equipment, the core network node being configured for:

transmitting, to a radio network node, an indication of the traffic steering policy, the traffic steering policy indicating at least one access resource and at least one of: a Packet Data Network (PDN) connection, a packet flow, and a bearer to use on the at least one access resource, the traffic steering policy differentiating between uplink and downlink when indicating the at least one access resource;

receiving access information from the radio network node, the access information indicating a currently used access resource, amongst the at least one access resource, for the at least one of: the PDN connection, packet flow, and bearer; and transmitting, to one of a charging node and a further core network node, the access information indicating the currently used access resource for the at least one of: the PDN connection, packet flow, and bearer.

11. The core network node according to claim 10, wherein the access resources comprise at least one of: licensed radio spectrum resources, unlicensed radio spectrum resources, and radio access technologies.

12. A charging node configured for enabling management of a traffic steering policy relating to access resources for providing an access to a network for a user equipment, the charging node being configured for:

receiving, from a core network node, access information indicating a currently used access resource for one of: a Packet Data Network (PDN) connection, packet flow, and bearer according to the traffic steering policy, the traffic steering policy differentiating between uplink and downlink when indicating the currently used access resource;

determining an amount of traffic for the one of: the PDN connection, packet flow, and bearer on the currently used access resource; and managing charging with respect to the user equipment based on the determined amount of traffic on the currently used access resource.

13. The charging node according to claim 12, wherein the charging node is a network node performing a Policy and Charging Enforcement function in communication with at least one of an Offline Charging System and an Online Charging System.

14. The charging node according to claim 12, wherein the access resources comprise at least one of: licensed radio spectrum resources, unlicensed radio spectrum resources, and radio access technologies.

* * * * *